US 12,299,919 B2

(12) United States Patent
Mori

(10) Patent No.: US 12,299,919 B2
(45) Date of Patent: May 13, 2025

(54) OBJECT RECOGNITION DEVICE AND OBJECT RECOGNITION METHOD BASED ON ANGLE AND DISTANCE RESOLUTION OF A SENSOR

(71) Applicant: Mitsubishi Electric Corporation, Tokyo (JP)

(72) Inventor: Masanori Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 432 days.

(21) Appl. No.: 17/778,101

(22) PCT Filed: Nov. 29, 2019

(86) PCT No.: PCT/JP2019/046806
§ 371 (c)(1),
(2) Date: May 19, 2022

(87) PCT Pub. No.: WO2021/106196
PCT Pub. Date: Jun. 3, 2021

(65) Prior Publication Data
US 2022/0414920 A1 Dec. 29, 2022

(51) Int. Cl.
G06T 7/73 (2017.01)
G06T 7/60 (2017.01)
G06V 20/58 (2022.01)
(52) U.S. Cl.
CPC ............. G06T 7/73 (2017.01); G06T 7/60 (2013.01); G06V 20/58 (2022.01)

(58) Field of Classification Search
CPC .. G06T 7/73; G06T 7/60; G06V 20/58; G01S 15/66; G01S 13/726; G01S 13/34;
(Continued)

(56) References Cited

U.S. PATENT DOCUMENTS

2017/0345180 A1* 11/2017 Sugiura ................. G06T 7/70

FOREIGN PATENT DOCUMENTS

| JP | 2002-122669 A | | 4/2002 |
| JP | 2009014479 A | * | 1/2009 |

(Continued)

OTHER PUBLICATIONS

Hyunggi Cho et al., "A Multi-Sensor Fusion System for Moving Object Detection and Tracking in Urban Driving Environments", IEEE International Conference on Robotics & Automation (ICRA), 2014, pp. 1836-1843.

(Continued)

Primary Examiner — Christopher Wait
(74) Attorney, Agent, or Firm — Sughrue Mion, PLLC

(57) ABSTRACT

Provided is an object recognition device including a temporary setting unit and an update processing unit. The temporary setting unit sets, based on specifications of an external information sensor that has detected an object, a position of at least one candidate point on the object. The update processing unit corrects a position of a detection point with respect to the external information sensor at a time when the external information sensor has detected the object based on the position of the candidate point on the object, and updates track data indicating a track of the object based on a position of the detection point with respect to the external information sensor after the correction.

12 Claims, 16 Drawing Sheets

(58) Field of Classification Search
CPC .... G01S 15/931; G01S 17/931; G01S 13/862; G01S 13/865; G01S 13/867; G01S 2013/93271; G01S 2013/93272; G01S 2013/93275; G01S 13/931; G08G 1/165; G08G 1/166; G08G 1/167
See application file for complete search history.

(56) References Cited

FOREIGN PATENT DOCUMENTS

| | | |
|---|---|---|
| JP | 2016-148514 A | 8/2016 |
| JP | 2017-215161 A | 12/2017 |

OTHER PUBLICATIONS

International Search Report for PCT/JP2019/046806 dated Feb. 18, 2020.

* cited by examiner

| TD \ DD | TD(P, V) | TD(P, V, W) | TD(P, V, L) | TD(P, V, W, L) |
|---|---|---|---|---|
| DD(P, V) | ●UPDATE TD(P, V) | ●UPDATE TD(P, V) | ●UPDATE TD(P, V) | ●UPDATE TD(P, V) |
| DD(P, V, W) | ●UPDATE TD(P, V)<br>●ADD DD(W) TO TD(P, V) | ●UPDATE TD(P, V, W) | ●UPDATE TD(P, V)<br>●ADD DD(W)<br>TO TD(P, V, L) | ●UPDATE TD(P, V, W) |
| DD(P, V, L) | ●UPDATE TD(P, V)<br>●ADD DD(L)<br>TO TD(P, V) | ●UPDATE TD(P, V)<br>●ADD DD(L)<br>TO TD(P, V) | ●UPDATE TD(P, V, L) | ●UPDATE TD(P, V, L) |
| DD(P, V, W, L) | ●UPDATE TD(P, V)<br>●ADD DD(W, L)<br>TO TD(P, V) | ●UPDATE TD(P, V, W)<br>●ADD DD(L)<br>TO TD(P, V, W) | ●UPDATE TD(P, V, L)<br>●ADD DD(W)<br>TO TD(P, V, L) | ●UPDATE TD(P, V, W, L) |

FIG.9

OBJECT RECOGNITION DEVICE AND OBJECT RECOGNITION METHOD BASED ON ANGLE AND DISTANCE RESOLUTION OF A SENSOR

CROSS REFERENCE TO RELATED APPLICATIONS

This application is a National Stage of International Application No. PCT/JP2019/046806 filed Nov. 29, 2019.

TECHNICAL FIELD

The present invention relates to an object recognition device and an object recognition method.

BACKGROUND ART

Hitherto, there has been known an object recognition device which fits, to a shape model of an object, a position of a detection point at a time when a sensor has detected the object, and identifies a position of a track point forming a track of the object based on the position of the detection point on the shape model of the object (for example, see Patent Literature 1).

CITATION LIST

Patent Literature

[PTL 1] JP 2017-215161 A

SUMMARY OF INVENTION

Technical Problem

However, the related-art object recognition device described in Patent Literature 1 may not be capable of identifying which position of the object the position of the detection point corresponds to depending on resolution of the sensor. In this case, the position of the detection point cannot be fit to the shape model of the object, and the position of the track point on the object cannot be identified. Thus, precision of the track data on the object indicating the track of the object decreases.

The present invention has been made in order to solve the above-mentioned problem, and has an object to provide an object recognition device and an object recognition method which are capable of increasing precision of track data on an object.

Solution to Problem

According to one embodiment of the present invention, there is provided an object recognition device including: a temporary setting unit configured to set, based on specifications of a sensor that has detected an object, a position of at least one candidate point on the object; and an update processing unit configured to correct a position of a detection point with respect to the sensor at a time when the sensor has detected the object based on the position of the at least one candidate point on the object, and to update track data indicating a track of the object based on a position of the detection point with respect to the sensor after the correction.

Advantageous Effects of Invention

According to the object recognition device of the present invention, it is possible to increase the precision of the track data on the object.

BRIEF DESCRIPTION OF DRAWINGS

FIG. 9 is a table for showing an update example of the track data of FIG. 7 based on the detection data of FIG. 8.

DESCRIPTION OF EMBODIMENTS

First Embodiment

Figure 1:
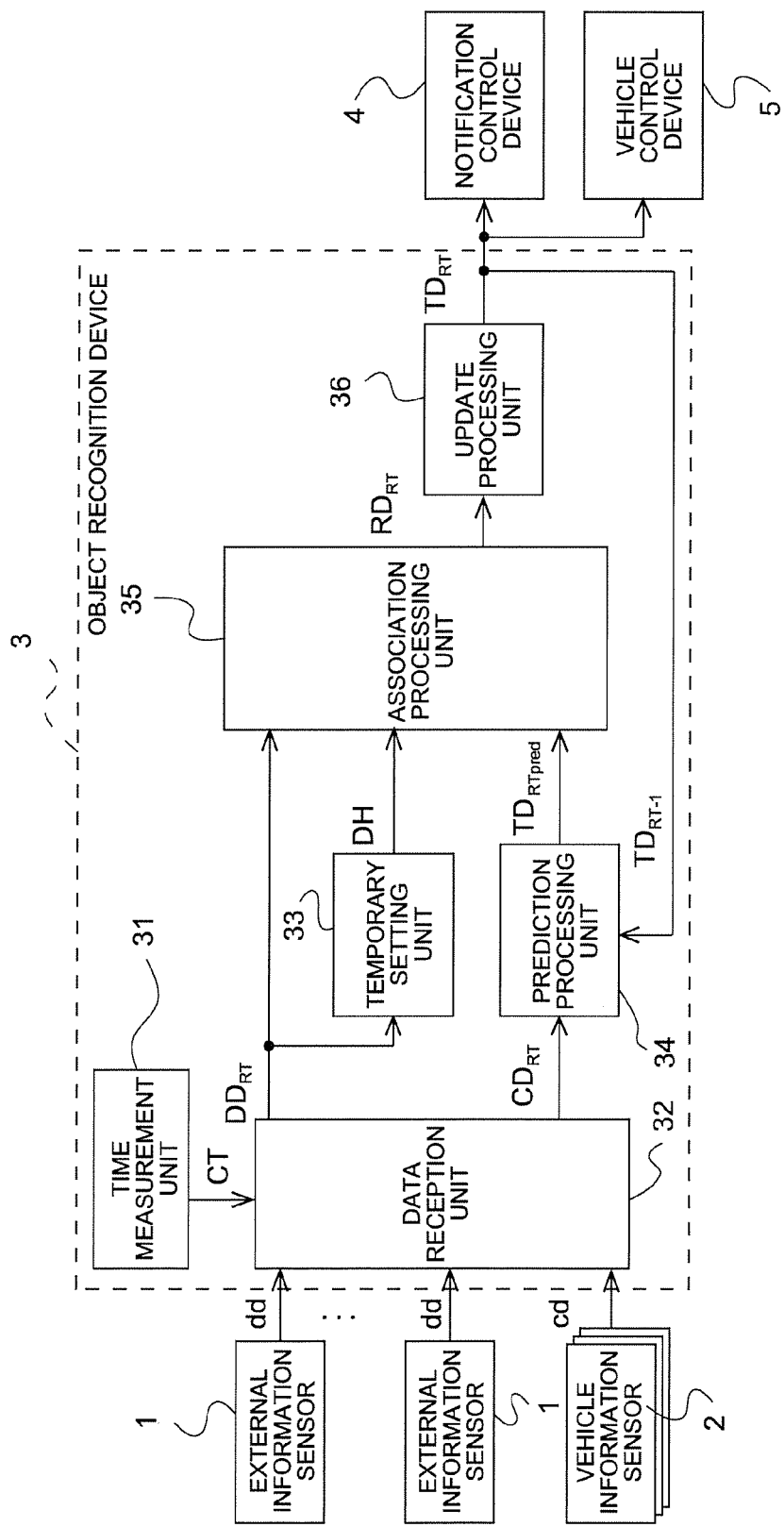
FIG. 1 is a block diagram for illustrating a functional configuration example of a vehicle control system in a first embodiment of the present invention.

FIG. 1 is a block diagram for illustrating a functional configuration example of a vehicle control system in a first embodiment of the present invention. As illustrated in FIG. 1, the vehicle control system includes a plurality of external information sensors 1, a plurality of vehicle information sensors 2, an object recognition device 3, a notification control device 4, and a vehicle control device 5.

Each of the plurality of external information sensors 1 is mounted to an own vehicle. For example, a part of the external information sensors 1 of the plurality of external information sensors 1 are individually mounted to an inside of a front bumper, an inside of a rear bumper, and a cabin side of a windshield. For the external information sensor 1 mounted to the inside of the front bumper, objects that exist forward or sideward of the vehicle are set as objects to be observed. For the external information sensor 1 mounted to the inside of the rear bumper, objects that exist backward or sideward of the vehicle are set as objects to be observed.

Moreover, the external information sensor 1 mounted on the cabin side of the windshield is arranged next to an inner rearview mirror. For the external information sensor 1 mounted next to the inner rear view mirror on the cabin side of the windshield, objects that exist forward of the vehicle are set as objects to be observed.

Thus, each of the plurality of external information sensors 1 mounted to the own vehicle is a sensor capable of acquiring, as detection data dd, the information on the objects around the own vehicle. The respective pieces of detection data dd on the objects around the own vehicle acquired by the plurality of external information sensors 1 are integrated into and generated as detection data DD. The detection data DD is generated to have a data configuration that can be supplied to the object recognition device 3. The detection data DD includes at least one piece of information on a position P of at least one detection point DP with respect to the external information sensor 1.

The external information sensor 1 observes an object by detecting any point on a surface of the object as a detection point. Each detection point DP indicates each point on the object observed by the external information sensor 1 around the own vehicle. For example, the external information sensor 1 irradiates light as irradiation light around the own vehicle, and receives reflected light reflected on each reflection point on the object. Each reflection point corresponds to each detection point DP.

Moreover, the information on the object that can be measured at the detection point DP varies depending on a measurement principle of the external information sensor 1. As types of the external information sensors 1, a millimeter wave radar, a laser sensor, an ultrasonic sensor, an infrared sensor, a camera, and the like can be used. Description of the ultrasonic sensor and the infrared sensor is omitted.

The millimeter wave radar is mounted to, for example, each of the front bumper and the rear bumper of the own vehicle. The millimeter wave radar includes one transmission antenna and a plurality of reception antennas. The millimeter wave radar can measure a distance and a relative speed to an object. The distance and the relative speed to the object are measured by, for example, a frequency modulation continuous wave (FMCW) method. Thus, the position P of the detection point DP with respect to the external information sensor 1 and the speed V of the detection point DP can be observed based on the distance and the relative speed to the object measured by the millimeter wave radar.

In the following description, the speed V of the detection point DP may be the relative speed between the own vehicle and the object, or may be a speed with respect to an absolute position acquired by further using the GPS.

The millimeter wave radar can measure an azimuth angle of the object. The azimuth angle of the object is measured based on phase differences among the respective radio waves received by the plurality of reception antennas. Thus, a direction $\theta$ of the object can be observed based on the azimuth angle of the object measured by the millimeter wave radar.

As described above, with the millimeter wave radar, there can be observed, as the information on the object, the detection data DD including the speed V of the detection point DP and the direction $\theta$ of the object in addition to the position P of the detection point DP with respect to the external information sensor 1. Of the position P of the detection point DP with respect to the external information sensor 1, the speed V of the detection point DP, and the direction $\theta$ of the object, each of the speed V of the detection point DP and the direction $\theta$ of the object is a dynamic element for identifying a state of the object. Each of those dynamic elements is an object identification element.

When the relative speed to the object is measured, the millimeter wave radar of the FMCW type detects a frequency shift caused by the Doppler effect between a frequency of a transmission signal and a frequency of a reception signal, that is, the Doppler frequency. The detected Doppler frequency is proportional to the relative speed to the object, and the relative speed can thus be derived from the Doppler frequency.

Moreover, speed resolution of the millimeter wave radar is determined by resolution of the Doppler frequency. The resolution of the Doppler frequency is a reciprocal of an observation period of the reception signal. Thus, as the observation period increases, the resolution of the Doppler frequency increases. Thus, as the observation period increases, the speed resolution of the millimeter wave radar increases.

For example, in a case in which the own vehicle is traveling on an expressway, the observation period of the millimeter wave radar is set to be longer compared with a case in which the own vehicle is traveling on a general road. Consequently, the speed resolution of the millimeter wave radar can be set to be high. Thus, in the case in which the own vehicle is traveling on an expressway, a change in the speed can be observed earlier compared with the case in which the own vehicle is traveling on a general road. Consequently, objects around the own vehicle can be observed earlier.

Moreover, distance resolution of the millimeter wave radar is defined as a quotient of the light speed by a modulation frequency band width. Thus, as the modulation frequency band width increases, the distance resolution of the millimeter wave radar increases.

For example, in a case in which the own vehicle is traveling in a parking lot, the modulation frequency band width is set to be wider compared with the case in which the own vehicle is traveling on a general road or an expressway. Consequently, the distance resolution of the millimeter wave radar can be set to be high. In a case in which the distance resolution of the millimeter wave radar is set to be high, the detectable minimum unit distance around the own vehicle is short, and thus it is possible to distinguish objects existing side by side from each other.

For example, when a pedestrian and a vehicle exist as the objects around the own vehicle, there is brought about a state in which there simultaneously exist the pedestrian having low reflection intensity to the electromagnetic wave irradiated from the millimeter wave radar and the vehicle having high reflection intensity thereto. Even under this state, the electromagnetic wave reflected from the pedestrian is not absorbed by the electromagnetic wave reflected from the vehicle, and the pedestrian can thus be detected.

The laser sensor is mounted to, for example, an outside of a roof of the own vehicle. As the laser sensor, for example, a light detection and ranging (LIDAR) sensor is mounted to the outside of the roof of the own vehicle. The LIDAR sensor includes a plurality of light emitting units, one light receiving unit, and a calculation unit. The plurality of light emitting units are arranged so as to face forward in a travel direction of the own vehicle at a plurality of angles with respect to a perpendicular direction of the own vehicle.

A time of flight (TOF) type is adopted for the LIDAR sensor. Specifically, the plurality of light emitting units of the LIDAR sensor have a function of radially emitting laser light while rotating in the horizontal direction during a light emitting time period set in advance. The light receiving unit of the LIDAR sensor has a function of receiving reflected light from an object during a light receiving time period set in advance. The calculation unit of the LIDAR sensor has a function of obtaining round-trip times each being a difference between a light emitting time in the plurality of light emitting units and a light receiving time in the light reception unit. The calculation unit of the LIDAR sensor has a function of obtaining the distances to the object based on the round-trip times.

The LIDAR sensor has a function of measuring also the direction to the object by obtaining the distance to the object. Thus, the position P of the detection point DP with respect to the external information sensor 1, the speed V of the detection point DP, and the direction θ of the object are observed from measurement results measured by the LIDAR sensor.

As described above, with the LIDAR sensor, the detection data DD including the speed V of the detection point DP and the direction θ of the object in addition to the position P of the detection point DP with respect to the external information sensor 1 can be observed as the information on the object. Of the position P of the detection point DP with respect to the external information sensor 1, the speed V of the detection point DP, and the direction θ of the object, each of the speed V of the detection point DP and the direction θ of the object is the object identification element as described above.

Moreover, the speed resolution of the LIDAR sensor is determined by a light emission interval of pulses forming the laser light. Thus, as the light emission interval of the pulses forming the laser light decreases, the speed resolution of the LIDAR sensor increases.

For example, in the case in which the own vehicle is traveling on an expressway, compared with the case in which the own vehicle is traveling on a general road, the speed resolution of the LIDAR sensor can be set to be higher by setting the light emission interval of the pulses forming the laser light irradiated from the LIDAR sensor to be short. Thus, in the case in which the own vehicle is traveling on an expressway, a change in the speed can be observed earlier compared with the case in which the own vehicle is traveling on a general road. Consequently, objects around the own vehicle can be observed earlier.

Moreover, the distance resolution of the LIDAR sensor is determined by a pulse width forming the laser light. Thus, as the pulse width forming the laser light decreases, the distance resolution of the LIDAR sensor increases.

For example, in the case in which the own vehicle is traveling in a parking lot, compared with the case in which the own vehicle is traveling on a general road or an expressway, the pulse width forming the laser light irradiated from the LIDAR sensor is set to be shorter. Consequently, the distance resolution of the LIDAR sensor can be set to be high. In a case in which the distance resolution of the LIDAR sensor is set to be high, the detectable minimum unit distance around the own vehicle is short, and thus it is possible to distinguish objects existing side by side from each other.

For example, when a pedestrian and a vehicle exist as the objects around the own vehicle, there is brought about a state in which there simultaneously exist the pedestrian having low reflection intensity to the laser light irradiated from the LIDAR sensor and the vehicle having high reflection intensity thereto. Even under this state, the reflection light reflected from the pedestrian is not absorbed by the reflection light reflected from the vehicle, and the pedestrian can thus be detected.

The camera is mounted next to the inner rear view mirror on the cabin side of the windshield. As the camera, for example, a monocular camera is used. The monocular camera includes an image pickup element. The image pickup element is, for example, a charge coupled device (CCD) image sensor or a complementary metal oxide semiconductor (CMOS) image sensor. The monocular camera continuously detects absence or presence of an object and a distance thereto while the minimum unit is a pixel level in a 2D space orthogonal to an image pickup direction of the image pickup element. The monocular camera includes, for example, structure in which a filter of primary colors including red, green, and blue is added to a lens. With this structure, the distance can be obtained based on parallax among light rays divided by the filter of the primary colors. Thus, the position P of the detection point DP with respect to the external information sensor 1 and a width W and a length L of the object are observed from measurement results measured by the camera.

As described above, with the camera, the detection data DD including the width W and the length L of the object in addition to the position P of the detection point DP with respect to the external information sensor 1 can be observed as the information on the object. Of the position P of the detection point DP with respect to the external information sensor 1, and the width W and the length L of the object, the width W and the length L of the object are static elements for identifying the size of the object. Each of those static elements is an object identification element.

For the camera, in addition to the monocular camera, a TOF camera, a stereo camera, an infrared camera, or the like is used.

The plurality of vehicle information sensors 2 have functions of detecting, as own vehicle data cd, vehicle information on the own vehicle such as a vehicle speed, a steering angle, and a yaw rate. The own vehicle data cd is generated to have a data configuration that can be supplied to the object recognition device 3.

The object recognition device 3 includes a time measurement unit 31, a data reception unit 32, a temporary setting unit 33, a prediction processing unit 34, a association processing unit 35, and an update processing unit 36. The time measurement unit 31, the data reception unit 32, the temporary setting unit 33, the prediction processing unit 34, the association processing unit 35, and the update processing unit 36 have functions achieved by a CPU which executes programs stored in a nonvolatile memory or a volatile memory.

The time measurement unit 31 has a function of measuring a time of the object recognition device 3. The time measuring unit 31 generates a measured time as a common time CT. The common time CT is generated to have a data configuration that can be supplied to the data reception unit 32.

The data reception unit 32 has a function of an input interface.

Specifically, the data reception unit 32 has a function of receiving the detection data dd from each external information sensor 1. Pieces of detection data dd are integrated into the detection data DD by the data reception unit 32. The data reception unit 32 has a function of associating the common time CT generated by the time measurement unit 31 with the detection data DD as an associated time RT, to thereby generate detection data $DD_{RT}$. The detection data $DD_{RT}$ is generated to have a data configuration that can be supplied to each of the temporary setting unit 33 and the association processing unit 35.

When the data reception unit 32 receives the detection data dd from the external information sensor 1, the data reception unit 32 determines that the detection data dd can be acquired. The data reception unit 32 sets, to 0, a defect flag indicating that a defect is occurring in the corresponding external information sensor 1, and generates the detection data $DD_{RT}$.

When the defect flag is set to 0, this setting indicates that a defect is not occurring in the corresponding external information sensor 1. Moreover, when the defect flag is set to 1, this setting indicates that a defect is occurring in the corresponding external information sensor 1.

Meanwhile, when the data reception unit 32 does not receive the detection data dd from the external information sensor 1, the data reception unit 32 determines that the detection data dd cannot be received, sets the defect flag to 1, and does not generate the detection data $DD_{RT}$.

Moreover, when the data reception unit 32 receives the detection data dd from the external information sensor 1, the data reception unit 32 determines validity of the detection data dd. When the data reception unit 32 determines that the detection data dd is not valid, the data reception unit 32 determines that the detection data dd cannot be acquired, and sets the validity flag to 0, which indicates that the detection data dd of the corresponding external information sensor 1 is not valid. When the data reception unit 32 determines that the detection data dd is valid, the data reception unit 32 determines that the detection data dd is acquired, and sets the validity flag to 1.

As described above, the result of determining, by the data reception unit 32, whether the detection data dd is acquired or not can be referred to by referring to at least one of the defect flag or the validity flag.

Moreover, the data reception unit 32 has a function of receiving the own vehicle data cd from the vehicle information sensors 2. The data reception unit 32 has a function of associating the common time CT generated by the time measurement unit 31 with the own vehicle data cd as the associated time RT, to thereby generate own vehicle data $CD_{RT}$. The own vehicle data $CD_{RT}$ is generated to have a data configuration that can be supplied to the prediction processing unit 34.

The temporary setting unit 33 has a function of setting, based on the resolution of the external information sensor 1 that has detected an object, a position HP of at least one candidate point DPH on the object. The temporary setting unit 33 has a function of generating temporary set data DH including a position HP of at least one candidate point DPH. The temporary set data DH is generated by the temporary setting unit 33 to have a data configuration that can be supplied to the association processing unit 35.

The resolution of the external information sensor 1 is included in specifications of the external information sensor 1.

Specifically, for example, attributes relating to operation settings of the external information sensor 1, attributes relating to an arrangement situation of the external information sensor 1, and the like are identified based on the specifications of the external information sensor 1. The attributes relating to the operation settings of the external information sensor 1 are an observable measurement range, resolution in the measurement range, a sampling frequency, and the like. The attributes relating to the arrangement situation of the external information sensor 1 are angles at which the external information sensor 1 can be arranged, an ambient temperature at which the external information sensor 1 can withstand, a measurable distance between the external information sensor 1 and an observation target, and the like.

The prediction processing unit 34 has a function of receiving the own vehicle data $CD_{RT}$ from the data reception unit 32. The prediction processing unit 34 has a function of receiving track data $TD_{RT-1}$ from the update processing unit 36. A previous associated time RT corresponding to a previous time of the current associated time RT, that is, an associated time RT-1, is associated with the track data $TD_{RT-1}$ of the track data TD. The prediction processing unit 34 has a function of generating prediction data $TD_{RTpred}$ of the track data $TD_{RT}$ at the associated time RT, by a well-known algorithm, based on the own vehicle data $CD_{RT}$ at the associated time RT and the track data $TD_{RT-1}$ at the associated time RT-1. The well-known algorithm is the Kalman filter or another algorithm that can predict, from observed values, a center point in an object that changes in a time series.

The association processing unit 35 has a function of receiving the detection data $DD_{RT}$, the temporary set data DH including the positions HP of the candidate points DPH, and the predicted data $TD_{RTpred}$ of the track data $TD_{RT}$. The association processing unit 35 has a function of determining whether or not the detection data $DD_{RT}$ and the prediction data $TD_{RTpred}$ of the track data TD associate with each other. Whether or not the detection data $DD_{RT}$ and the prediction data $TD_{RTpred}$ of the track data $TD_{RT}$ associate with each other is determined through use of a simple nearest neighbor (SNN) algorithm, a global nearest neighbor (GNN) algorithm, a joint probabilistic data association (JPDA) algorithm, or the like.

Specifically, whether or not the detection data $DD_{RT}$ and the prediction data $TD_{RTpred}$ of the track data $TD_{RT}$ associate with each other is determined based on whether or not a Mahalanobis distance is within a gate range. The Mahalanobis distance is derived based on the position P of the detection point DP with respect to the external information sensor 1 included in the detection data $DD_{RT}$ and the position P of the center point in an object included in the prediction data $TD_{RTpred}$ of the track data $TD_{RT}$. When the derived Mahalanobis distance is within the gate range, it is determined that the detection data $DD_{RT}$ and the prediction data $TD_{RTpred}$ of the track data $TD_{RT}$ associate with each other. When the derived Mahalanobis distance is not within the gate range, it is determined that the detection data $DD_{RT}$ and the prediction data $TD_{RTpred}$ of the track data $TD_{RT}$ do not associate with each other.

The gate range is set to an observable range of the external information sensor 1. The observable range of the external information sensor 1 changes depending on the type of the external information sensor 1. Thus, the gate range changes depending on the type of the external information sensor 1.

The association processing unit 35 has a function of determining that the detection data $DD_{RT}$ and the prediction data $TD_{RTpred}$ of the track data $TD_{RT}$ correspond to each other when the detection data $DD_{RT}$ and the prediction data $TD_{RTpred}$ of the track data $TD_{RT}$ associate with each other. The association processing unit 35 has a function of generating association data $RD_{RT}$ obtained by integrating, together with the data relating to the determined correspondence, the detection data $DD_{RT}$, the temporary set data DH including the positions HP of the candidate points DPH, and the prediction data $TD_{RTpred}$ of the track data $TD_{RT}$. The association data $RD_{RT}$ is generated by the association processing unit 35 to have a data configuration that can be supplied to the update processing unit 36.

The update processing unit 36 has a function of receiving the association data $RD_{RT}$. The update processing unit 36 has a function of updating the track data $TD_{RT}$ based on the position P of the detection point DP and the positions HP of the candidate points DPH. Description is given below of details of the function of updating the track data $TD_{RT}$.

The notification control device 4 has a function of receiving the track data $TD_{RT}$. The notification control device 4 has a function of generating notification data based on the track data $TD_{RT}$. The notification data is data for identifying contents to be notified, and is generated to have a format that corresponds to a device being an output destination. The notification control device 4 outputs the notification data to a display (not shown), to thereby cause the display to notify the contents of the notification data. Consequently, the contents of the notification data are visually notified to a driver in the cabin. The notification control device 4 outputs the notification data to a speaker, to thereby cause the speaker to notify the contents of the notification data. Consequently, the contents of the notification data are aurally notified to the driver in the cabin.

The vehicle control device 5 has a function of receiving the track data $TD_{RT}$ output by the update processing unit 36. The vehicle control device 5 has a function of controlling operation of the own vehicle based on the track data $TD_{RT}$. The vehicle control device 5 controls the operation of the own vehicle based on the track data $TD_{RT}$ so that the own vehicle avoids objects.

Figure 2:
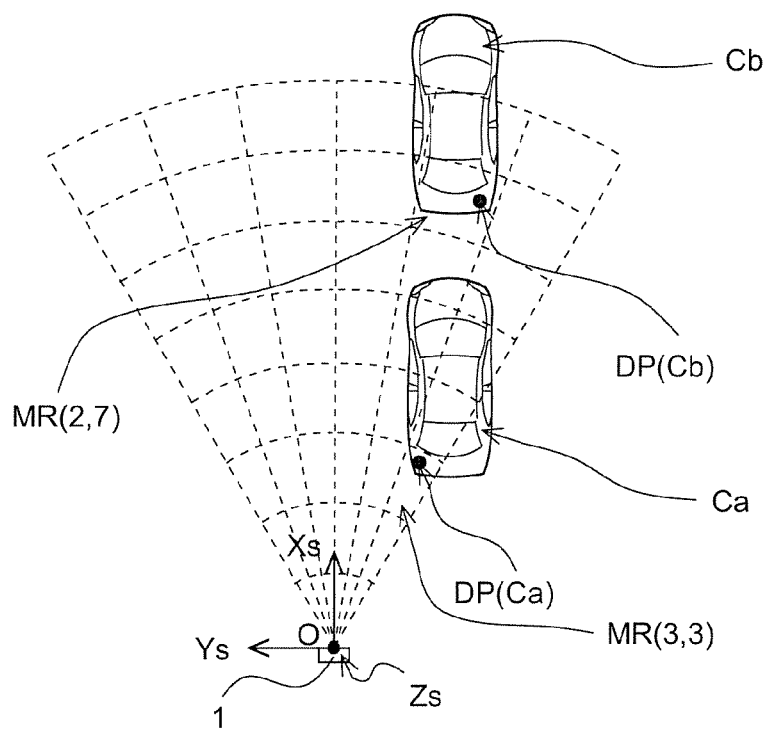
FIG. 2 is a diagram for illustrating an example of relative positional relationships between a sensor of FIG. 1 and objects.

FIG. 2 is a diagram for illustrating an example of relative positional relationships between the external information sensor 1 of FIG. 1 and objects.

A point at the center of the external information sensor 1 as viewed from the front side is set as an origin O. A horizontal axis that passes through the origin O and is in the left-and-right direction is defined as Ys axis. On the Ys axis, a right direction as the external information sensor 1 is viewed from the front side is defined as a positive direction. A vertical axis that passes through the origin O and is in the up-and-down direction is defined as Zs axis. On the Zs axis, an up direction as the external information sensor 1 is viewed from the front side is defined as a positive direction. An axis that passes through the origin O and is in a front-and-rear direction orthogonal to the Ys axis and the Zs axis is defined as an Xs axis. On the Xs axis, a front direction of the external information sensor 1 is defined as a positive direction.

As indicated by the broken lines of FIG. 2, an observable range of the external information sensor 1 is divided into a plurality of virtual resolution cells. The resolution cells are identified based on the resolution of the external information sensor 1. The resolution cells are obtained by dividing the observable range of the external information sensor 1 in accordance with angle resolution and the distance resolution of the external information sensor 1. As described above, the angle resolution and the distance resolution of the external information sensor 1 vary depending on the measurement principle of the external information sensor 1.

Each resolution cell is identified by a minimum detection range MR(i, j). The value "i" identifies a location of the resolution cell along a circumferential direction with respect to the origin O as a reference. The value "j" identifies a location of the resolution cell along a radial direction of concentric circles with respect to the origin O as a reference. Thus, the number of "i's" varies depending on the angle resolution of the external information sensor 1. Consequently, as the angle resolution of the external information sensor 1 increases, the maximum number of "i's" increases. Meanwhile, the number of "j's" varies depending on the distance resolution of the external information sensor 1. Thus, as the distance resolution of the external information sensor 1 increases, the maximum number of "j's" increases. Regarding a positive sign and a negative sign of "i", a clockwise direction with respect to the Xs axis as a reference is defined as a positive circumferential direction. A counterclockwise direction with respect to the Xs axis as the reference is defined as a negative circumferential direction.

When the external information sensor 1 detects a vehicle Ca, a detection point DP(Ca) is included in a minimum detection range MR(3, 3). The minimum detection range MR(3, 3) is set to such a size that only a rear left side of the vehicle Ca is included. Thus, a positional relationship between the position P of the detection point DP(Ca) and the vehicle Ca is identified, and hence the position P of the detection point DP(Ca) on the vehicle Ca is identified as the rear left side of the vehicle Ca. Moreover, the detection point DP(Ca) is included in the minimum detection range MR(3, 3), and hence the position P of the detection point DP(Ca) with respect to the external information sensor 1 is identified as a position P of the closest point having the shortest distance from the external information sensor 1 to the vehicle Ca.

Meanwhile, when the external information sensor 1 detects a vehicle Cb, a detection point DP(Cb) is included in a minimum detection range MR(2, 7). When those minimum detection ranges are compared with each other along the radial direction of the concentric circles with respect to the origin O as the reference, the minimum detection range MR(2, 7) is more apart from the origin O than the minimum detection range MR(3, 3). As the minimum detection range MR(i, j), that is, the resolution cell, becomes more apart from the origin O along the radial direction of the concentric circles, the angle resolution of the external information sensor 1 decreases. Thus, the angle resolution of the external information sensor 1 in the minimum detection range MR(2, 7) is lower than the angle resolution of the external information sensor 1 in the minimum detection range MR(3, 3).

Moreover, the minimum detection range MR(2, 7) is set to such a size that an entire rear portion of the vehicle Cb is included. Thus, it is not possible to determine which position P of the entire rear portion of the vehicle Cb the position P of the detection point DP(Cb) is. Thus, it is not possible to identify a positional relationship between the position P of the detection point DP(Cb) and the vehicle Cb. Consequently, the position P of the detection point DP(Cb) on the vehicle Cb cannot be identified.

Description is now given of processing of identifying the position P of the detection point DP(Cb) on the vehicle Cb.

Figure 3:
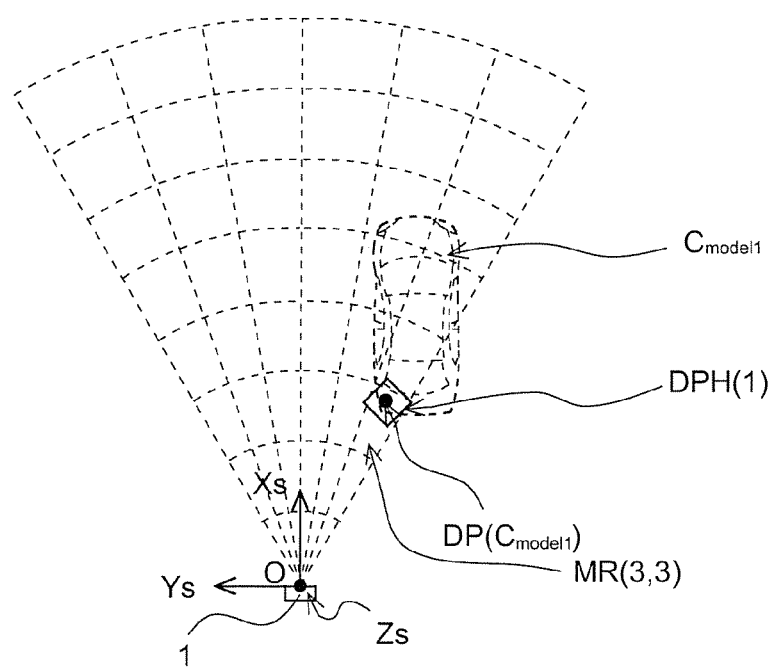
FIG. 3 is a diagram for illustrating an example of a candidate point being a first candidate of a position of a detection point on a vehicle corresponding to a vehicle of FIG. 2.

FIG. 3 is a diagram for illustrating an example of a candidate point DPH(1) being a first candidate of a position P of a detection point DP($C_{model1}$) in a vehicle $C_{model1}$ corresponding to the vehicle Ca of FIG. 2. When the external information sensor 1 detects the vehicle $C_{model1}$ as an object, the detection point DP($C_{model1}$) is included in the minimum detection range MR(3, 3). The minimum detection range MR(3, 3) is set to such a size that only the rear left side of the vehicle $C_{model1}$ is included. Thus, as described above, as the position P of the detection point DP ($C_{model1}$) on the vehicle $C_{model1}$, the closest point is estimated. When the closest point is estimated as the position P of the detection point DP ($C_{model1}$) on the vehicle $C_{model1}$, the position HP of the candidate point DPH(1) is a first candidate of the position P of the detection point DP ($C_{model1}$) on the vehicle $C_{model1}$.

In other words, in the example of FIG. 3, the position HP of the candidate point DPH(1) is the first candidate of the position P of the detection point DP ($C_{model1}$) on the vehicle $C_{model1}$.

Figure 4:
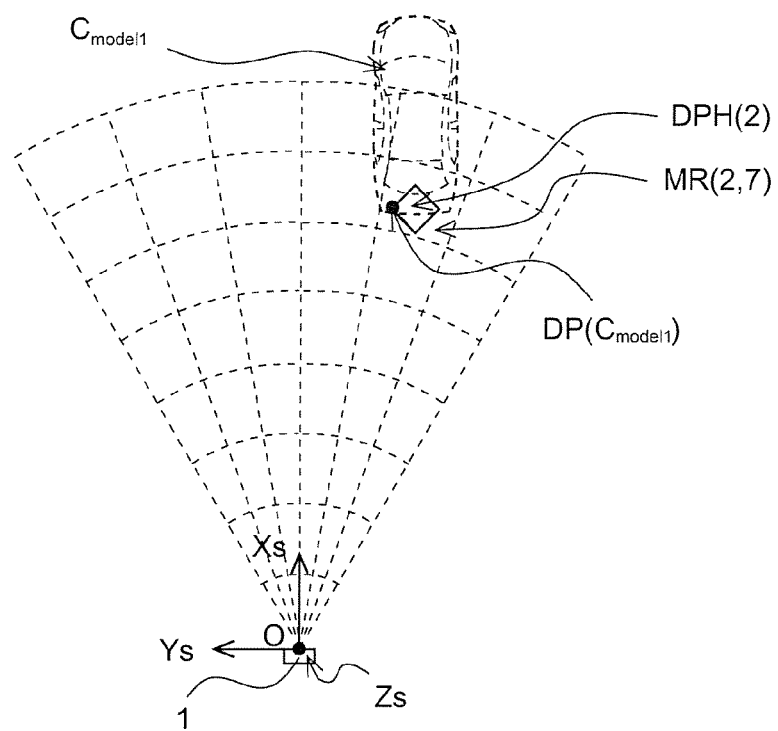
FIG. 4 is a diagram for illustrating an example of a candidate point being a second candidate of a position P of the detection point on the vehicle corresponding to the vehicle of FIG. 2.

FIG. 4 is a diagram for illustrating an example of a candidate point DPH(2) being a second candidate of a position P of a detection point DP($C_{model1}$) in a vehicle $C_{model1}$ corresponding to the vehicle Cb of FIG. 4. When the external information sensor 1 detects the vehicle $C_{model1}$ as an object, the detection point DP($C_{model1}$) is included in the minimum detection range MR(2, 7). The minimum detection range MR(2, 7) is set to such a size that the entire rear portion of the vehicle $C_{model1}$ is included. Thus, as described above, it is not possible to determine which position P of the entire rear portion of the vehicle $C_{model1}$ the position P of the detection point DP($C_{model1}$) is. When it is not possible to determine which position P of the entire rear portion of the vehicle $C_{model1}$ the position P of the detection point DP ($C_{model1}$) is, a position HP of a candidate point DPH(2) is the second candidate of the position P of the detection point DP ($C_{model1}$) on the vehicle $C_{model1}$. The position HP of the candidate point DPH(2) is estimated as a rear-surface center point in the rear portion of the vehicle $C_{model1}$ The rear-surface center point is a point at the center observed when the rear portion of the vehicle $C_{model1}$ is viewed from the front side.

In other words, in the example of FIG. 4, the position HP of the candidate point DPH(2) is the second candidate of the position P of the detection point DP ($C_{model1}$) on the vehicle $C_{model1}$.

Figure 5:
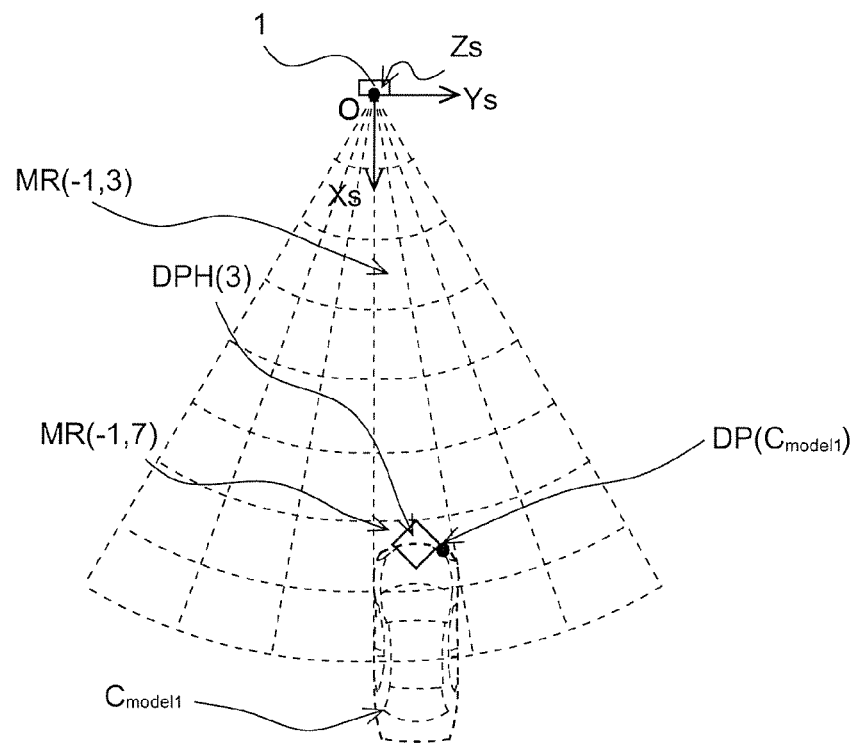
FIG. 5 is a diagram for illustrating an example of a candidate point being another candidate of a position of a detection point on a vehicle.

FIG. 5 is a diagram for illustrating an example of a candidate point DPH(3) being another candidate of the position P of the detection point DP ($C_{model1}$) on the vehicle $C_{model1}$. When the external information sensor 1 detects the vehicle $C_{model1}$ as an object, the detection point DP($C_{model1}$) is included in the minimum detection range MR(-1, 7). For example, the minimum detection range MR(-1, 7) is more apart from the origin O than a minimum detection range MR(-1, 3). Thus, the angle resolution of the external information sensor 1 in the minimum detection range MR(-1, 7) is lower than the angle resolution of the external information sensor 1 in the minimum detection range MR(-1, 3).

Specifically, the minimum detection range MR(-1, 7) is set to such a size that an entire front portion of the vehicle $C_{model1}$ is included. Thus, it is not possible to determine which position P of the entire front portion of the vehicle $C_{model1}$ the position P of the detection point DP($C_{model1}$) is. When it is not possible to determine which position P of the entire front portion of the vehicle $C_{model1}$ the position P of the detection point DP($C_{model1}$) is, a position HP of a candidate point DPH(3) is another candidate of the position P of the detection point DP ($C_{model1}$) on the vehicle $C_{model1}$. The position HP of the candidate point DPH(3) is estimated as a front-surface center point in the front portion of the vehicle $C_{model1}$ The front-surface center point is a point at the center observed when the front portion of the vehicle $C_{model1}$ is viewed from the front side.

In other words, in the example of FIG. 5, the position HP of the candidate point DPH(3) is another candidate of the position P of the detection point DP ($C_{model1}$) on the vehicle $C_{model1}$.

Referring to FIG. 3 and FIG. 4, when the external information sensor 1 is a millimeter wave radar for monitoring the front side of the own vehicle, the position HP of each of the candidate point DPH(1) and the candidate point DPH(2) is the candidate of the position P of the detection point DP($C_{model1}$) on the vehicle $C_{model1}$.

Moreover, referring to FIG. 4, when the external information sensor 1 is a camera for monitoring the front side of the own vehicle, the position HP of the candidate point DPH(2) is the candidate of the position P of the detection point DP ($C_{model1}$) on the vehicle $C_{model1}$.

Moreover, referring to FIG. 3 and FIG. 5, when the external information sensor 1 is a millimeter wave radar for monitoring the rear side of the own vehicle, the position HP of each of the candidate point DPH(1) and the candidate point DPH(3) is the candidate of the position P of the detection point DP ($C_{model1}$) on the vehicle $C_{model1}$.

As described above, there are a plurality of candidate points DPH of the position P of the detection point DP ($C_{model1}$), when processing of selecting one candidate point DPH of the plurality of candidate points DPH(N) is not executed, it is not possible to identify the position P of the detection point DP ($C_{model1}$) on the vehicle $C_{model1}$. Thus, description is now given of processing of selecting one candidate point DPH of a plurality of candidate points DPH(N) and adopting the selected candidate point DPH as the candidate of the position P of the detection point DP ($C_{model1}$) on the vehicle $C_{model1}$.

Figure 6:
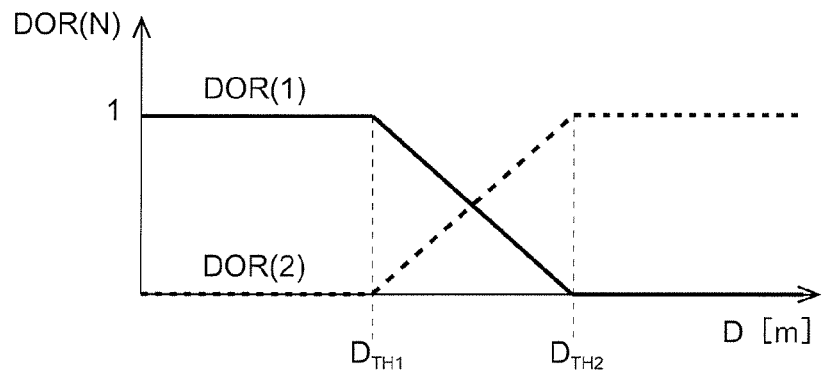
FIG. 6 is a graph for showing a setting example of a reliability of the candidate points of FIG. 3 to FIG. 5 where N is a natural number.

FIG. 6 is a graph for showing a setting example of a reliability DOR(N) of the candidate point DPH(N) of FIG. 3 to FIG. 5 where N is a natural number. In the example of FIG. 6, to the reliability DOR(N), a real number of 0 or more and 1 or less is set. As described above, when the external information sensor 1 is a millimeter wave radar for monitoring the front side of the own vehicle, the candidate point DPH(1) and the candidate point DPH(2) are the candidates of the detection point DP ($C_{model1}$) on the vehicle $C_{model1}$.

Thus, a reliability DOR(1) for the candidate point DPH(1) and a reliability DOR(2) for the candidate point DPH(2) are compared to each other, and one of the candidate point DPH(1) or the candidate point DPH(2) is consequently selected, and is set as the candidate of the position P of the detection point DP ($C_{model1}$) on the vehicle $C_{model1}$. Consequently, one of the candidate point DPH(1) or the candidate point DPH(2) is adopted.

Specifically, as described above, as the resolution cell becomes more apart from the origin O along the radial direction of the concentric circles, the angle resolution of the external information sensor 1 decreases. In other words, as the resolution cell becomes closer to the origin O along the radial direction of the concentric circles, the angle resolution of the external information sensor 1 increases.

Thus, when the distance from the external information sensor 1 to the detection point DP($C_{model1}$) is short, the rear portion of the vehicle $C_{model1}$ is not buried in the resolution cell. Accordingly, when the distance from the external information sensor 1 to the detection point DP($C_{model1}$) is short, the reliability DOR is high.

In other words, the reliability DOR of the candidate point DPH is determined based on the distance from the external information sensor 1 to the detection point DP.

Thus, when the distance from the external information sensor 1 to the detection point DP($C_{model1}$) is shorter than a determination threshold distance $D_{TH1}$ of FIG. 6, the reliability DOR(1) for the candidate point DPH(1) is set to 1, and the reliability DOR(2) for the candidate point DPH(2) is set to 0. In this case, the reliability DOR(1) is higher in reliability DOR than the reliability DOR(2), and the reliability DOR(1) is thus selected. When the reliability DOR(1) is selected and set, the candidate point DPH(1) corresponding to the reliability DOR(1) is adopted. The position HP of the candidate point DPH(1) on the vehicle $C_{model1}$ is the position P of the closest point on the vehicle $C_{model1}$.

Thus, the position P of the detection point DP($C_{model1}$) on the vehicle $C_{model1}$ is assumed to be the position P of the closest point on the vehicle $C_{model1}$ based on the position HP of the adopted candidate point DPH(1).

In other words, when the distance from the external information sensor 1 to the detection point DP($C_{model1}$) is shorter than the determination threshold distance $D_{TH1}$ of FIG. 6, the position HP of the candidate point DPH(1) of the plurality of candidate points DPH(N) is selected as the candidate of the position P of the detection point DP ($C_{model1}$) on the vehicle $C_{model1}$. Consequently, the position P of the detection point DP($C_{model1}$) on the vehicle $C_{model1}$ is assumed to be the position P of the closest point on the vehicle $C_{model1}$.

Meanwhile, when the distance from the external information sensor 1 to the detection point DP ($C_{model1}$) is long, the rear portion of the vehicle $C_{model1}$ is buried in the resolution cell. Thus, when the distance from the external information sensor 1 to the detection point DP($C_{model1}$) is long, the reliability DOR is low.

Thus, when the distance from the external information sensor 1 to the detection point DP($C_{model1}$) is equal to or longer than a determination threshold distance $D_{TH2}$ of FIG. 6, the reliability DOR(1) for the candidate point DPH(1) is set to 0, and the reliability DOR(2) for the candidate point DPH(2) is set to 1. In this case, the reliability DOR(2) is higher in reliability DOR than the reliability DOR(1), and the reliability DOR(2) is thus selected. When the reliability DOR(2) is selected and set, the candidate point DPH(2) corresponding to the reliability DOR(2) is adopted. The position HP of the candidate point DPH(2) on the vehicle $C_{model1}$ is the position P of the rear-surface center point on the vehicle $C_{model1}$.

Thus, the position P of the detection point DP($C_{model1}$) on the vehicle $C_{model1}$ is assumed to be the position P of the rear-surface center point on the vehicle $C_{model1}$ based on the position HP of the adopted candidate point DPH(2).

In other words, when the distance from the external information sensor 1 to the detection point DP($C_{model1}$) is equal to or longer than the determination threshold distance $D_{TH2}$ of FIG. 6, the position HP of the candidate point DPH(2) of the plurality of candidate points DPH(N) is selected as the candidate of the position P of the detection point DP($C_{model1}$) on the vehicle $C_{model1}$. Consequently, the position P of the detection point DP($C_{model1}$) on the vehicle $C_{model1}$ is assumed to be the position P of the rear-surface center point on the vehicle $C_{model1}$.

The determination threshold distance $D_{TH1}$ of FIG. 6 is set to a distance including the minimum detection range MR(3, 3) of FIG. 3 or FIG. 5 of the distance from the origin O along the radial direction of the concentric circles. That is, the determination threshold distance $D_{TH1}$ of FIG. 6 is set to a distance including the minimum detection range MR(i, 3) of FIG. 3, FIG. 4, and FIG. 5 of the distance from the origin O along the radial direction of the concentric circles.

Meanwhile, the determination threshold distance $D_{TH2}$ of FIG. 6 is set to, of the distance from the origin O along the radial direction of the concentric circles, a distance including the minimum detection range MR(2, 7) of FIG. 4. That is, the determination threshold distance $D_{TH2}$ of FIG. 6 is set to, of the distance from the origin O along the radial direction of the concentric circles, a distance including the minimum detection range MR(i, 7) of FIG. 3, FIG. 4, and FIG. 5.

In other words, the threshold distance $D_{TH2}$ is set to a distance more apart from the origin O than the determination threshold distance $D_{TH1}$. Specifically, the reliability DOR(1) is set to 1 when the distance is shorter than the determination threshold distance $D_{TH1}$, starts decreasing when the distance becomes longer than the determination threshold distance $D_{TH1}$, and is set to 0 when the distance is equal to or longer than the determination threshold distance $D_{TH2}$ Meanwhile, the reliability DOR(2) is set to 0 when the distance is shorter than the determination threshold distance $D_{TH1}$, starts increasing when the distance becomes longer than the determination threshold distance $D_{TH1}$, and is set to 1 when the distance is equal to or longer than the determination threshold distance $D_{TH2}$. As described above, the reliability DOR (1) and the reliability DOR(2) are set so that tendencies opposite to each other are indicated when the distance is shorter than the determination threshold distance $D_{TH1}$ and when the distance is longer than the determination threshold distance $D_{TH2}$. Each of the reliability DOR(1) and the reliability DOR(2) at the time when the distance is equal to or longer than the determination threshold distance $D_{TH1}$ and is shorter than the determination threshold distance $D_{TH2}$ is determined based on a ratio between the distance resolution and the angle resolution of the external information sensor 1.

Figure 7:
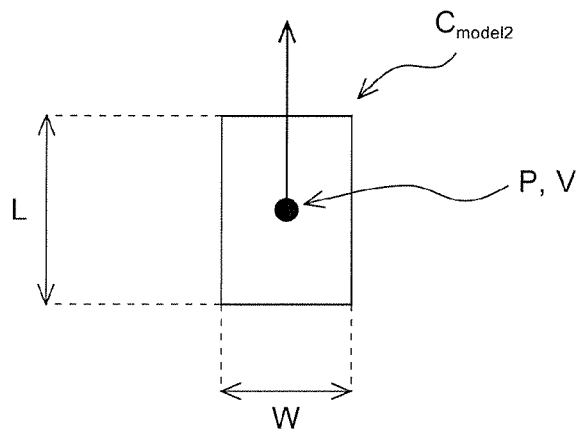
FIG. 7 is a diagram for illustrating an example of track data of FIG. 1.

FIG. 7 is a diagram for illustrating an example of the track data TD of FIG. 1. The track data TD includes four elements being a position P of a center point in a vehicle $C_{model2}$, a speed V of the center point in the vehicle $C_{model2}$, a width W of the vehicle $C_{model2}$, and a length L of the vehicle $C_{model2}$ Of the four elements of the position P of the center point in the vehicle $C_{model2}$, the speed V of the center point in the vehicle $C_{model2}$, the width W of the vehicle $C_{model2}$, and the length L of the vehicle $C_{model2}$, three elements of the speed V of the center point in the vehicle $C_{model2}$, the width W of the vehicle $C_{model2}$, and the length L of the vehicle $C_{model2}$ are object identification elements. The position P of the center point in the vehicle $C_{model2}$ and the speed V of the center point in the vehicle $C_{model2}$ indicate states of an object observable by the millimeter wave radar or the LIDAR sensor. The width W of the vehicle $C_{model2}$ and the length L of the vehicle $C_{model2}$ indicate the size of the object observable by the camera.

Thus, the track data TD is data formed by integrating the observation results of the plurality of different types of external information sensors 1. For example, the track data TD is configured as vector data such as TD(P, V, W, L).

Figure 8:
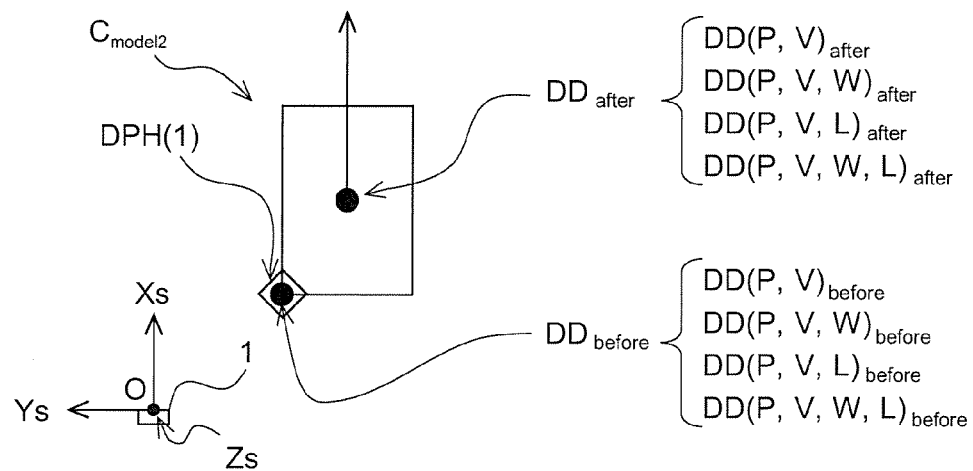
FIG. 8 is a diagram for illustrating a correction example of detection data of FIG. 1.

FIG. 8 is a diagram for illustrating a correction example of the detection data DD of FIG. 1. Each of the object identification elements included in the detection data DD corresponds to each object identification element included in the track data TD. Specifically, the detection data DD includes, of the position P of the detection point DP with respect to the external information sensor 1, the speed V of the detection point DP, the width W of the vehicle $C_{model2}$, and the length L of the vehicle $C_{model2}$, the speed V of the detection point DP, the width W of the vehicle $C_{model2}$, and the length L of the vehicle $C_{model2}$ as the object identification elements.

Thus, for example, the detection data DD is configured as vector data, for example, DD(P, V, W, L), similarly to the track data TD.

In the example of FIG. 8, the position P of the detection point DP with respect to the external information sensor 1 of detection data $DD_{before}$ before the correction is identified based on the position HP of the candidate point DPH(1), and is then corrected to the center point in the object as detection data $DD_{after}$ after the correction. The track data TD of FIG. 7 is corrected based on the position P of the detection point DP with respect to the external information sensor 1 after the correction included in the detection data $DD_{after}$.

In other words, the update processing unit 36 corrects the position P of the detection point DP with respect to the external information sensor 1 based on the position HP of the candidate point DPH on the object, and updates the track data TD indicating the track of the object based on the position P of the detection point DP with respect to the external information sensor 1 after the correction.

Specifically, when there are a plurality of candidate points DPH corresponding to one detection point DP, the update processing unit 36 corrects the position P of the detection point DP with respect to the external information sensor 1 based on the reliability DOR of each of the plurality of candidate points DPH and the position HP of each of the plurality of candidate points DPH on the object as a prior stage to the update of the track data TD indicating the track of the object.

More specifically, the update processing unit 36 corrects the position P of the detection point DP with respect to the external information sensor 1 based on the position HP of the candidate point DPH having the highest reliability DOR of the plurality of candidate points DPH on the object.

For example, when the candidate point DPH having the highest reliability DOR is the candidate point DPH(1), the candidate point DPH(1) is adopted. As described above, the position HP of the candidate point DPH(1) is the position P of the closest point on the vehicle $C_{model2}$. Consequently, the position P of the detection point DP on the vehicle $C_{model2}$ is assumed to be the position P of the closest point on the vehicle $C_{model2}$.

In the example of FIG. 8, this closest point corresponds to a rear-portion left end on the vehicle $C_{model2}$. Thus, coordinates of a position P of the rear-portion left end on the vehicle $C_{model2}$ have the external information sensor 1 as the origin O. The coordinates of the position P of the rear-portion left end on the vehicle $C_{model2}$ are determined from coordinates of the position P of the detection point DP with respect to the external information sensor 1. When the coordinates of the position P of the rear-portion left end on the vehicle $C_{model2}$ are determined, a correction amount from the position P of the rear-portion left end on the vehicle $C_{model2}$ to the center point in the vehicle $C_{model2}$ is accurately determined through use of the width W and the length L of the vehicle $C_{model2}$ detected by the external information sensor 1. As described above, the position P of the center point in the vehicle $C_{model2}$ is identified from the position P of the detection point DP through the position HP of the candidate point DPH(1).

Specifically, for the position P of the detection point DP with respect to the external information sensor 1 included in the detection data $DD_{before}$ before the correction, ½ of the length L of the vehicle $C_{model2}$ is added to a position $P_{Xs}$ in the Xs axis direction. Moreover, for the position P of the detection point DP with respect to the external information sensor 1 included in the detection data $DD_{before}$ before the correction, ½ of the width W of the vehicle $C_{model2}$ is subtracted from a position $P_{Ys}$ in the Ys axis direction. As a result, the position P of the center point in the vehicle $C_{model2}$ is identified from the position P of the detection point DP through the position HP of the candidate point DPH.

Moreover, for example, when the candidate point DPH having the highest reliability DOR is the candidate point DPH(2), the candidate point DPH(2) is adopted. As described above, the position HP of the candidate point DPH(2) is the position P of the rear-surface center point. Consequently, the position P of the detection point DP on the vehicle $C_{model2}$ is assumed to be the position P of the rear-surface center point on the vehicle $C_{model2}$.

Thus, coordinates of a position P of the rear-surface center point on the vehicle $C_{model2}$ have the external information sensor 1 as the origin O. The coordinates of the position P of the rear-surface center point on the vehicle $C_{model2}$ are obtained from coordinates of the position P of the detection point DP with respect to the external information sensor 1. When the coordinates of the position P of the rear-surface center point on the vehicle $C_{model2}$ are determined, a correction amount from the position P of the rear-surface center point on the vehicle $C_{model2}$ to the center point in the vehicle $C_{model2}$ is accurately determined through use of the width W of the vehicle $C_{model2}$ detected by the external information sensor 1 and the length L of the vehicle $C_{model2}$ detected by the external information sensor 1. As described above, the position P of the center point in the vehicle $C_{model2}$ is identified from the position P of the detection point DP through the position HP of the candidate point DPH(2).

Specifically, for the position P included in the detection data $DD_{before}$ before the correction, ½ of the length L of the vehicle $C_{model2}$ is added to the position $P_{Xs}$ in the Xs axis direction. Moreover, for the position P included in the detection data $DD_{before}$ before the correction, the candidate point DPH(2) is adopted, and the position $P_{Ys}$ in the Ys axis direction is thus maintained. As a result, the position P of the center point in the vehicle $C_{model2}$ is identified from the detected position P of the detection point DP through the position HP of the candidate point DPH (2).

In other words, the update processing unit 36 assumes that the position P of the detection point DP on the object is the position HP of the selected candidate point DPH. Consequently, the position P of the detection point DP on the object is identified as the position HP of the candidate point DPH. As a result, the position P of the detection point DP on the object is identified through the identification of the positional relationship between the object and the position P of the detection point DP.

Moreover, the position P of the detection point DP with respect to the external information sensor 1 is observed. Thus, when a positional relationship between the position P of the detection point DP on the object and the position P of the center point in the object is identified, the position P of the detection point DP with respect to the external information sensor 1 can be corrected to the position P of the center point in the object.

Thus, the update processing unit 36 obtains the correction amount for correcting the identified position P of the detection point DP on the object to the position P of the center point in the object.

The update processing unit 36 uses the obtained correction amount to correct the position P of the detection point DP on the object to the position P of the center point in the object. As a result, the update processing unit 36 corrects the position P of the detection point DP with respect to the external information sensor 1. The update processing unit 36 updates the track data TD indicating the track of the object based on the position P of the detection point DP with respect to the external information sensor 1 after the correction.

However, as described above in detail, the object identification elements included in the observable detection data DD vary depending on the type of the external information sensor 1, specifically, the measurement principal of the external information sensor 1. As described above, the object identification element identifies at least one of the state or the size of the object.

Thus, the update processing unit 36 corrects the position P of the detection point DP with respect to the external information sensor 1 based on the object identification elements that identify at least one of the state or the size of the object. The update processing unit 36 updates the track data TD based on the position P of the detection point DP with respect to the external information sensor 1 after the correction.

For example, when only the position P of the detection point DP with respect to the external information sensor 1 and the speed V of the detection point DP are included in the detection data DD, the position P of the detection point DP is assumed to be the position HP of the candidate point DPH. Consequently, the positional relationship between the position P of the detection point DP and the vehicle $C_{model2}$ is identified through the position HP of the candidate point DPH. As a result, the position P of the detection point DP on the vehicle $C_{model2}$ is identified, and hence the correction amount for correcting the position P of the detection point DP with respect to the external information sensor 1 to the position P of the center point in the vehicle $C_{model2}$ is obtained through the position P of the detection point DP on the vehicle $C_{model2}$. The position P of the detection point DP with respect to the external information sensor 1 is corrected by correcting the position P of the detection point DP on the vehicle $C_{model2}$ to the position P of the center point in the vehicle $C_{model2}$ through use of the correction amount. This position P of the center point is the position P of the detection point DP with respect to the external information sensor 1 after the correction. The track data TD is updated based on the position P of this center point.

Moreover, for example, when only the position P of the detection point DP with respect to the external information sensor 1, the speed V of the detection point DP, and the width W of the vehicle $C_{model2}$ are included in the detection data DD, the position $P_{Ys}$ of the detection point DP in the Ys axis direction is identified as the position P of the center point in the Ys axis direction on the vehicle $C_{model2}$, and the position $P_{Xs}$ of the detection point DP in the Xs axis direction is assumed to be the position $P_{Xs}$ of the candidate point DPH in the Xs axis direction. Consequently, the positional relationship between the position P of the detection point DP and the vehicle $C_{model2}$ is identified through the position P of the center point in the Ys axis direction on the vehicle $C_{model2}$ and the position $P_{Xs}$ of the candidate point DPH in the Xs axis direction. As a result, the position P of the detection point DP on the vehicle $C_{model2}$ is identified, and hence the correction amount for correcting the position P of the detection point DP with respect to the external information sensor 1 to the position P of the center point in the vehicle $C_{model2}$ is obtained through the position P of the detection point DP on the vehicle $C_{model2}$. The position P of the detection point DP with respect to the external information sensor 1 is corrected by correcting the position P of the detection point DP on the vehicle $C_{model2}$ to the position P of the center point in the vehicle $C_{model2}$ through use of the correction amount. This position P of the center point is the position P of the detection point DP with respect to the external information sensor 1 after the correction. The track data TD is updated based on the position P of this center point.

Moreover, for example, when only the position P of the detection point DP with respect to the external information sensor 1, the speed V of the detection point DP, and the length L of the vehicle $C_{model2}$ are included in the detection data DD, the position $P_{Xs}$ of the detection point DP in the Xs axis direction is identified as the position P of the center point in the Xs axis direction on the vehicle $C_{model2}$, and the position $P_{Ys}$ of the detection point DP in the Ys axis direction is assumed to be the position $P_{Ys}$ of the candidate point DPH in the Ys axis method. Consequently, the positional relationship between the position P of the detection point DP and the vehicle $C_{model2}$ is identified through the position P of the center point in the Xs axis direction on the vehicle $C_{model2}$ and the position $P_{Ys}$ of the candidate point DPH in the Ys axis method. As a result, the position P of the detection point DP on the vehicle $C_{model2}$ is identified, and hence the correction amount for correcting the position P of the detection point DP with respect to the external information sensor 1 to the position P of the center point in the vehicle $C_{model2}$ is obtained through the position P of the detection point DP on the vehicle $C_{model2}$. The position P of the detection point DP with respect to the external information sensor 1 is corrected by correcting the position P of the detection point DP on the vehicle $C_{model2}$ to the position P of the center point in the vehicle $C_{model2}$ through use of the correction amount. This position P of the center point is the position P of the detection point DP with respect to the external information sensor 1 after the correction. The track data TD is updated based on the position P of this center point.

Moreover, for example, when only the position P of the detection point DP with respect to the external information sensor 1, the speed V of the detection point DP, the width W of the vehicle $C_{model2}$, and the length L of the vehicle $C_{model2}$ are included in the detection data DD, the position $P_{Ys}$ of the detection point DP in the Ys axis direction is identified as the position P of the center point in the Ys axis direction on the vehicle $C_{model2}$, and the position $P_{Xs}$ of the detection point DP in the Xs axis direction is identified as the position P of the center point in the Xs axis direction on the vehicle $C_{model2}$. Consequently, the positional relationship between the position P of the detection point DP and the vehicle $C_{model2}$ is identified through the position P of the center point in the Ys axis direction on the vehicle $C_{model2}$ and the position P of the center point in the Xs axis direction on the vehicle $C_{model2}$ As a result, the position P of the detection point DP on the vehicle $C_{model2}$ is identified, and hence the correction amount for correcting the position P of the detection point DP with respect to the external information sensor 1 to the position P of the center point in the vehicle $C_{model2}$ is obtained through the position P of the detection point DP on the vehicle $C_{model2}$ The position P of the detection point DP with respect to the external information sensor 1 is corrected by correcting the position P of the detection point DP on the vehicle $C_{model2}$ to the position P of the center point in the vehicle $C_{model2}$ through use of the correction amount. This position P of the center point is the position P of the detection point DP with respect to the external information sensor 1 after the correction. The track data TD is updated based on the position P of this center point.

The track data TD is updated by, specifically, tracking processing such as a least-squares method, a Kalman filter, and a particle filter.

There may be used, not the position HP of the candidate point DPH having the highest reliability DOR, but a position HP of a candidate point DPH obtained by averaging the respective positions P of the plurality of candidate points DPH weighted by the reliability DOR. Specifically, the update processing unit 36 obtains the weighted average of the respective positions P of the plurality of candidate points DPH on the object in accordance with the respective reliabilities DOR, to thereby correct the position P of the detection point DP with respect to the external information sensor 1.

Description is now given of an example in which update contents of the track data TD change in accordance with a combination of the object identification elements included in the detection data DD and the object identification elements included in the track data TD. FIG. 9 is a table for showing an update example of the track data TD based on the detection data DD of FIG. 8. In the example of FIG. 9, set values are individually set in advance for object identification elements that cannot be acquired from the external information sensor 1. When the object identification elements cannot be acquired from the external information sensor 1, the processing is executed while considering that the object identification elements do not exist.

When at least one of the width W or the length L of the object can be acquired as the object identification element from the external information sensor 1, and the detection data DD and the track data TD associate with each other, the update processing unit 36 updates the track data TD based on the object identification element that can be acquired from the external information sensor 1.

Meanwhile, when at least one of the width W or the length L of the object cannot be acquired as the object identification element from the external information sensor 1, the update processing unit 36 identifies the value of the object identification element that cannot be acquired from the external information sensor 1 based on the set value that corresponds to the object identification element that cannot be acquired from the external information sensor 1, among the set values individually set in correspondence with the width W and the length L of the object.

Figure 10:
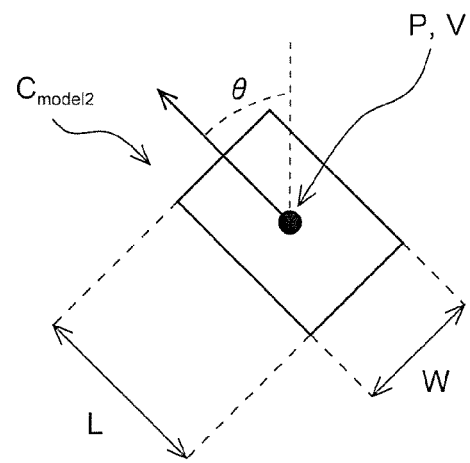
FIG. 10 is a diagram for illustrating an example in which a direction is further included in the track data of FIG. 7.

FIG. 10 is a diagram for illustrating an example in which the direction θ is further included in the track data TD of FIG. 7. The width W of the vehicle $C_{model2}$ is a size of the vehicle $C_{model2}$ perpendicular to the direction θ of the vehicle $C_{model2}$ The length L of the vehicle $C_{model2}$ is a size of the vehicle $C_{model2}$ parallel to the direction θ of the vehicle $C_{model2}$.

When the direction θ of the vehicle $C_{model2}$ can be acquired by the measurement principle of the external information sensor 1, the direction θ of the vehicle $C_{model2}$ is added as an object identification element of the detection data DD. When the direction θ of the vehicle $C_{model2}$ cannot be acquired by the measurement principle of the external information sensor 1, setting of the direction θ changes in accordance with a ground speed of the vehicle $C_{model2}$, that is, the object.

When the ground speed of the object is not zero, the direction θ of the vehicle $C_{model2}$ is observable as a direction of a ground speed vector, and can thus be acquired. Meanwhile, when the ground speed of the object is zero, that is, the object is a stationary object, an initial angle of 0 [deg] is included in the temporary set data DH as a set value set in advance.

Figure 11:
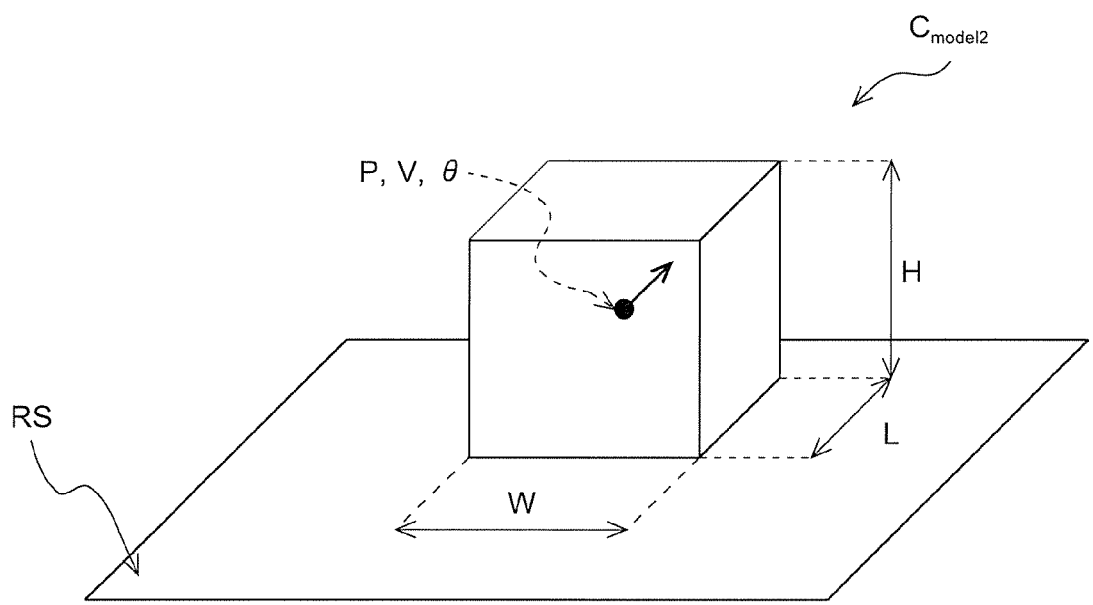
FIG. 11 is a diagram for illustrating an example in which a height is further included in the track data of FIG. 7.

FIG. 11 is a diagram for illustrating an example in which a height H is further included in the track data TD of FIG. 7. It is assumed that the direction θ of the vehicle $C_{model2}$ is parallel to a road surface RS, and is perpendicular to the height H of the vehicle $C_{model2}$.

When the height H of the vehicle $C_{model2}$ can be acquired by the measurement principle of the external information sensor 1, the height H of the vehicle $C_{model2}$ is added as an object identification element of the detection data DD. When the height H of the vehicle $C_{model2}$ cannot be acquired by the measurement principle of the external information sensor 1, an initial height of 1.5 [m] is included in the temporary set data DH as a set value set in advance.

Figure 12:
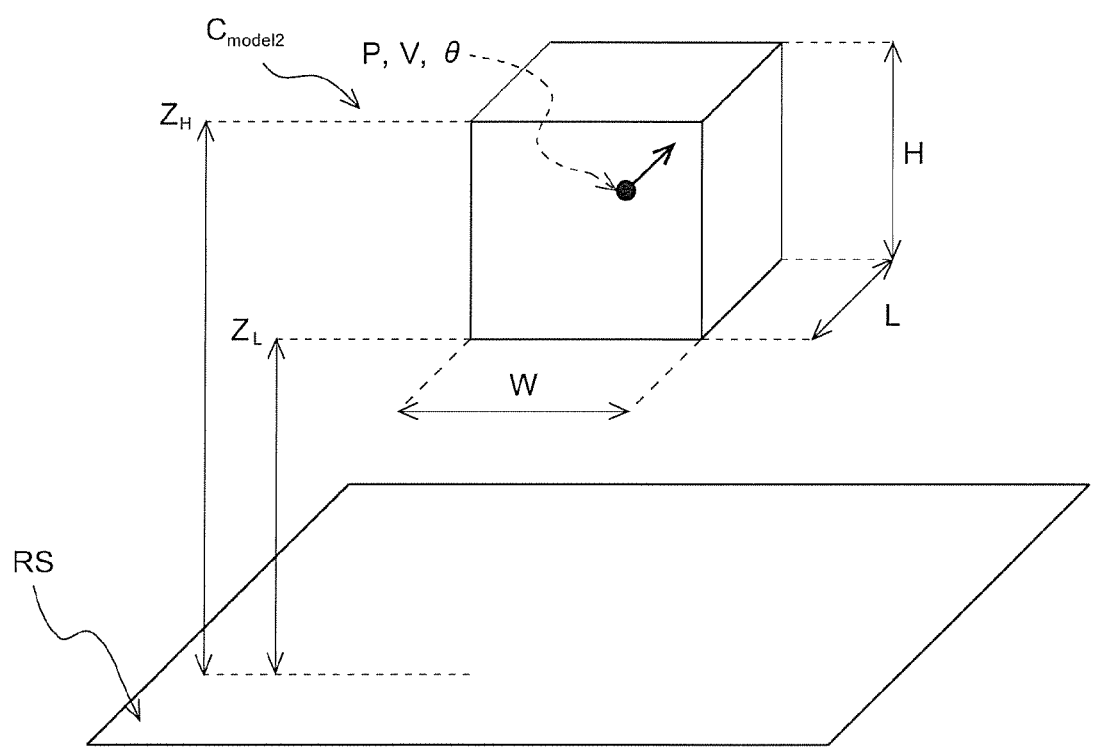
FIG. 12 is a diagram for illustrating an example in which a position of an upper end and a position of a lower end are further included in the track data of FIG. 7.

FIG. 12 is a diagram for illustrating an example in which a position of an upper end $Z_H$ and a position of a lower end $Z_L$ are further included in the track data TD of FIG. 7. It is assumed that "position of upper end $Z_H \geq$ position of lower end $Z_L$" is satisfied. When the position of the lower end $Z_L$ is higher than 0 [m], the object is determined as an object existing above the object such as a signboard or a traffic sign.

When the position of the upper end $Z_H$ and the position of the lower end $Z_L$ can be acquired by the measurement principle of the external information sensor 1, the position of the upper end $Z_H$ and the position of the lower end $Z_L$ are added as detection elements of the detection data DD. When the position of the upper end $Z_H$ and the position of the lower end $Z_L$ cannot be acquired by the measurement principle of the external information sensor 1, an initial upper end $Z_{HDEF}$ of 1.5 [m] and an initial lower end $Z_{LDEF}$ of 0 [m] are included in the temporary set data DH as set values set in advance.

Figure 13:
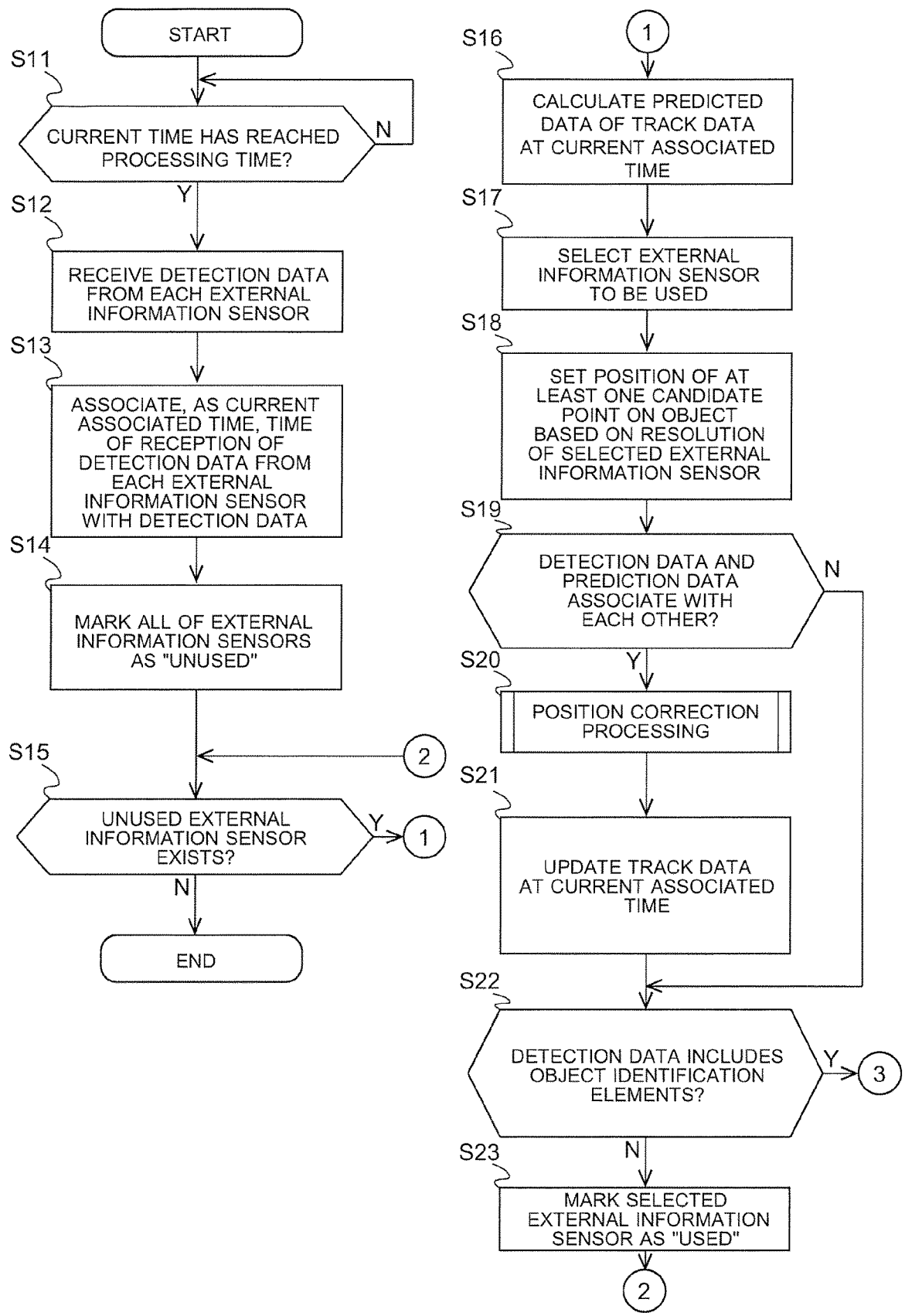
FIG. 13 is a flowchart for illustrating processing executed by the object recognition device of FIG. 1.

FIG. 13 is a flowchart for illustrating processing executed by the object recognition device 3 of FIG. 1. In Step S11, the time measurement unit 31 determines whether or not the current time has reached a processing time tk. When the time measurement unit 31 determines that the current time has reached the processing time tk, the process proceeds from Step S11 to Step S12. When the time measurement unit 31 determines that the current time has not reached the processing time tk, the processing step of Step S11 continues.

In Step S12, the data reception unit 32 receives the detection data dd from each external information sensor 1. After that, the process proceeds from Step S12 to Step S13.

In Step S13, the data reception unit 32 associates, as the current associated time RT, a time at which the detection data dd has been received from each external information sensor 1 with the detection data DD. After that, the process proceeds from Step S13 to Step S14.

In Step S14, the data reception unit 32 marks all of the external information sensors 1 as "unused". After that, the process proceeds from Step S14 to Step S15.

In Step S15, the data reception unit 32 determines whether or not an unused external information sensor 1 exists. When the data reception unit 32 determines that an unused external information sensor 1 exists, the process proceeds from Step S15 to Step S16. When the data reception unit 32 determines that an unused external information sensor 1 does not exist, the process does not proceed from Step S15 to other processing steps, and is finished.

In Step S16, the prediction processing unit 34 calculates the prediction data $TD_{RTpred}$ of the track data TD at the current associated time RT from the track data TD at the previous associated time RT. After that, the process proceeds from Step S16 to Step S17.

In Step S17, the temporary setting unit 33 selects an external information sensor 1 to be used. After that, the process proceeds from Step S17 to Step S18.

In Step S18, the temporary setting unit 33 sets a position HP of at least one candidate point DPH on an object detected by the selected external information sensor 1 based on the resolution of the selected external information sensor 1. After that, the process proceeds from Step S18 to Step S19.

In Step S19, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S19 to Step S20. When the association processing unit 35 determines that the detection data $DD_{RT}$ and the prediction data $TD_{RTpred}$ of the track data TD do not associate with each other, the process proceeds from Step S19 to Step S22.

In Step S20, the update processing unit 36 executes position correction processing described below with reference to FIG. 14. After that, the process proceeds from Step S20 to Step S21.

In Step S21, the update processing unit 36 updates the track data TD at the current associated time RT based on the position P of the detection point DP with respect to the external information sensor 1 at the current associated time RT after the correction. After that, the process proceeds from Step S21 to Step S22.

In Step S22, the temporary setting unit 33 determines whether or not the detection data DD includes object identification elements. When the temporary setting unit 33 determines that the detection data DD includes object identification elements, the process proceeds from Step S22 to Step S51 described below with reference to FIG. 15. When the temporary setting unit 33 determines that the detection data DD does not include object identification elements, the process proceeds from Step S22 to Step S23.

In Step S23, the data reception unit 32 marks the selected external information sensor 1 as "used". After that, the process proceeds from Step S23 to Step S15.

Figure 14:
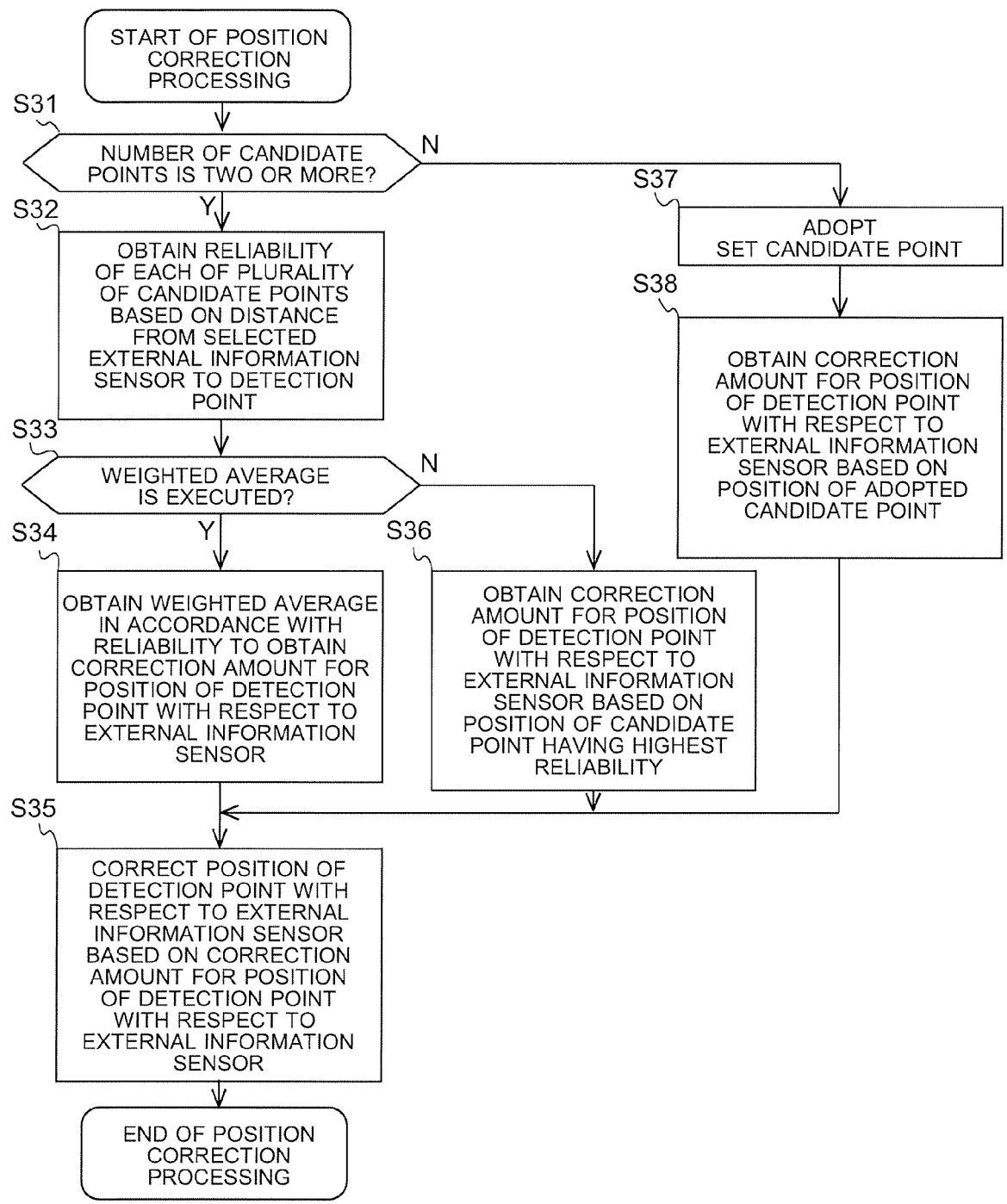
FIG. 14 is a flowchart for illustrating position correction processing executed in Step S20 of FIG. 13.

FIG. 14 is a flowchart for illustrating the position correction processing executed in Step S20 of FIG. 13. In Step S31, the update processing unit 36 determines whether or not the number of candidate points DPH is two or more. When the update processing unit 36 determines that the number of candidate points DPH is two or more, the process proceeds from Step S31 to Step S32. When the update processing unit 36 determines that the number of candidate points DPH is not two or more, the process proceeds from Step S31 to Step S37.

In Step S32, the update processing unit 36 obtains the reliability DOR of each of the plurality of candidate points DPH based on the distance from the selected external information sensor 1 to the detection point DP. After that, the process proceeds from Step S32 to Step S33.

In Step S33, the update processing unit 36 determines whether or not the weighted averaging is to be executed. When the temporary setting unit 33 determines to execute the weighted averaging, the process proceeds from Step S33 to Step S34. When the temporary setting unit 33 determines not to execute the weighted averaging, the process proceeds from Step S33 to Step S36.

In Step S34, the update processing unit 36 obtains the weighted average of the respective positions P of the plurality of candidate points DPH on the object in accordance with the reliabilities DOR, to thereby obtain the correction amount for the position P of the detection point DP with respect to the external information sensor 1. After that, the process proceeds from Step S34 to Step S35.

In Step S35, the update processing unit 36 corrects the position P of the detection point DP with respect to the external information sensor 1 included in the detection data DD at the current associated time RT based on the correction amount for the position P of the detection point DP with respect to the external information sensor 1. After that, the process does not proceed from Step S35 to other processing steps, and the position correction processing is thus finished.

In Step S36, the update processing unit 36 obtains a correction amount for the position P of the detection point DP with respect to the external information sensor 1 based on a position HP of a candidate point DPH having the highest reliability DOR of the positions HP of the plurality of candidate points DPH. After that, the process proceeds from Step S36 to Step S35.

In Step S37, the update processing unit 36 adopts the set candidate point DPH. After that, the process proceeds from Step S37 to Step S38.

In Step S38, the update processing unit 36 obtains the correction amount for the position P of the detection point DP with respect to the external information sensor 1 based on the position HP of the adopted candidate point DPH. After that, the process proceeds from Step S38 to Step S35.

Figure 15:
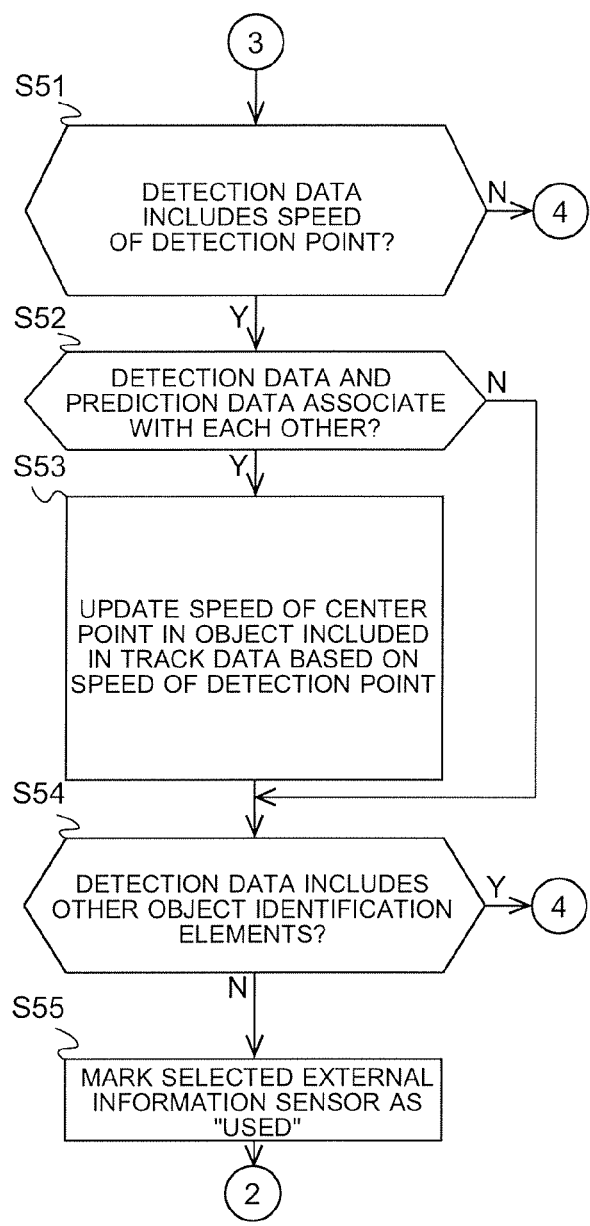
FIG. 15 is a flowchart for illustrating processing that branches when a determination result of determination processing in Step S22 of FIG. 13 is "Yes".

FIG. 15 is a flowchart for illustrating processing that branches when the determination result of the determination processing in Step S22 of FIG. 13 is "Yes". In Step S51, the temporary setting unit 33 determines whether or not the detection data dd received from the selected external information sensor includes the speed V of the detection point DP. When the temporary setting unit 33 determines that the detection data dd received from the selected external information sensor 1 includes the speed V of the detection point DP, the process proceeds from Step S51 to Step S52. When the temporary setting unit 33 determines that the detection data dd received from the selected external information sensor 1 does not include the speed V of the detection point DP, the process proceeds from Step S51 to Step S81 described below with reference to FIG. 16.

In Step S52, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S52 to Step S53. When the association processing unit 35 determines that the detection data $DD_{RT}$ and the prediction data $TD_{RTpred}$ of the track data TD do not associate with each other, the process proceeds from Step S52 to Step S54.

In Step S53, the update processing unit 36 updates the speed V of the center point in the object included in the track data TD at the current associated time RT based on the speed V of the detection point DP at the current associated time RT. After that, the process proceeds from Step S53 to Step S54.

In Step S54, the temporary setting unit 33 determines whether or not the detection data dd received from the selected external information sensor 1 includes other object identification elements. When the temporary setting unit 33 determines that the detection data dd received from the selected external information sensor 1 includes other object identification elements, the process proceeds from Step S54 to Step S81 described below with reference to FIG. 16. When the temporary setting unit 33 determines that the detection data dd received from the selected external information sensor 1 does not include other object identification elements, the process proceeds from Step S54 to Step S55.

In Step S55, the data reception unit 32 marks the selected external information sensor 1 as "used". After that, the process returns from Step S55 to Step S15 of FIG. 13.

Figure 16:
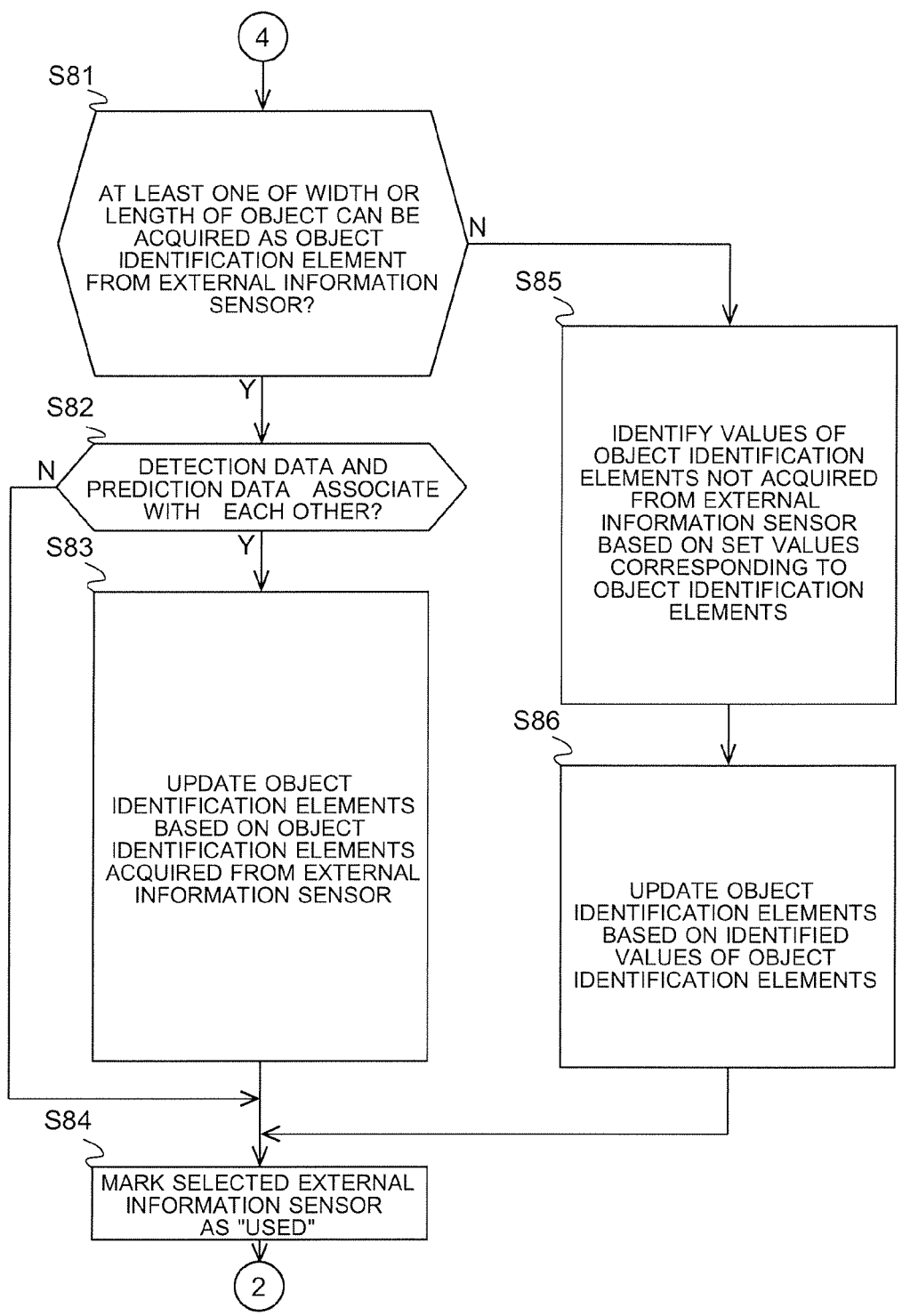
FIG. 16 is a flowchart for illustrating processing that branches when a determination result of determination processing in Step S51 of FIG. 15 is "No" and when a determination result of determination processing in Step S54 is "Yes".

FIG. 16 is a flowchart for illustrating processing that branches when the determination result of the determination processing in Step S51 of FIG. 15 is "No" and when the determination result of the determination processing in Step S54 is "Yes". In Step S81, the temporary setting unit 33 determines whether or not at least one of the width W or the length L of the object, which are the remaining object identification elements included in the detection data dd received from the selected external information sensor 1, can be acquired as an object identification element from the external information sensor 1. When the temporary setting unit 33 determines that at least one of the width W or the length L of the object, which are the remaining object identification elements included in the detection data dd received from the selected external information sensor 1, can be acquired as an object identification element from the external information sensor 1, the process proceeds from Step S81 to Step S82. When the temporary setting unit 33 determines that at least one of the width W or the length L of the object, which are the remaining object identification elements included in the detection data dd received from the selected external information sensor 1, cannot be acquired as an object identification element from the external information sensor 1, the process proceeds from Step S81 to Step S85.

In Step S82, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S82 to Step S83. When the association processing unit 35 determines that the detection data $DD_{RT}$ and the prediction data $TD_{RTpred}$ of the track data TD do not associate with each other, the process proceeds from Step S82 to Step S84.

In Step S83, based on the object identification elements that can be acquired from the external information sensor 1 of the width W and the length L of the object at the current associated time RT, the update processing unit 36 updates object identification elements that correspond to the object identification elements that can be acquired from the external information sensor 1 among the object identification elements included in the track data TD at the current associated time RT. After that, the process proceeds from Step S83 to Step S84.

In Step S84, the data reception unit 32 marks the selected external information sensor 1 as "used". After that, the process returns from Step S84 to Step S15 of FIG. 13.

In Step S85, the update processing unit 36 identifies the object identification elements which cannot be acquired from the external information sensor 1, based on the set values that correspond to the object identification elements that cannot be obtained from the external information sensor 1 among the set values individually set in advance in correspondence with the width W and the length L of the object. After that, the process proceeds from Step S85 to Step S86.

In Step S86, the update processing unit 36 updates, based on the value of the identified object identification elements, object identification elements that correspond to the identified object identification elements among the object identification elements included in the track data TD at the current associated time RT. After that, the process proceeds from Step S86 to Step S84.

As described above, in the object recognition device 3, the temporary setting unit 33 sets a position HP of at least one candidate point DPH on an object based on the specifications of the external information sensor 1 that has detected the object. Moreover, in the object recognition device 3, the update processing unit 36 corrects the position of the detection point DP with respect to the external information sensor 1 at the time when the external information sensor 1 has detected the object based on the position HP of the candidate point DPH on the object. The update processing unit 36 updates the track data TD indicating the track of the object based on the position P of the detection point DP with respect to the external information sensor 1 after the correction.

As described above, the external information sensor 1 has the resolution that varies depending on the specifications of the external information sensor 1. Thus, the update processing unit 36 corrects the position P of the detection point DP based on the position of the candidate point DPH at the prior stage to the update of the track data TD. The temporary setting unit 33 sets the position HP of the at least one candidate point DPH on the object based on the specifications of the external information sensor 1 that has detected the object at the prior stage to the correction of the position P of the detection point DP by the update processing unit 36. Thus, the track data TD can be updated based on the position P of the detection point DP with respect to the external information sensor 1 after the correction of the displacement caused by the resolution included in the specifications of the external information sensor 1. Consequently, precision of the track data TD on the object can be increased.

When there are plurality of candidate points DPH for one detection point DP, the update processing unit 36 corrects the position P of the detection point DP with respect to the external information sensor 1 based on the reliability DOR of each of the plurality of candidate points DPH and the positions P of each of the plurality of candidate points DPH on the object. Thus, the position P of the detection point DP with respect to the external information sensor 1 is corrected also in consideration of the reliability DOR of the position HP of the candidate point DPH. Consequently, each of the plurality of candidate points DPH can effectively be used.

Moreover, the update processing unit 36 corrects the position P of the detection point DP with respect to the external information sensor 1 based on the position HP of the candidate point DPH that has the highest reliability DOR among the positions HP of the plurality of candidate points DPH on the object.

When there are a plurality of candidate points DPH on one object, the respective set precisions of the positions HP of the plurality of candidate points DPH on the one object may be different from one another. Thus, the update processing unit 36 corrects the position P of the detection point DP with respect to the external information sensor 1 based on the position HP of the candidate point DPH that has the highest reliability DOR among the positions HP of the plurality of candidate points DPH on the one object. Thus, the position HP of the candidate point DPH having the highest set precision on the one object can be used. Consequently, it is possible to use the position HP of the candidate point DPH that has the highest set precision among the positions HP of the plurality of candidate points DPH on the one object set based on the resolution of the same external information sensor 1.

Moreover, the update processing unit 36 obtains the weighted average of the respective positions P of the plurality of candidate points DPH on one object in accordance with the reliabilities DOR, to thereby correct the position P of the detection point DP with respect to the external information sensor 1.

When there are a plurality of candidate points DPH on one object, the respective set precisions of the positions HP of the plurality of candidate points DPH on the one object are different from one another. Thus, the update processing unit 36 obtains the weighted average of the positions HP of the plurality of candidate points DPH on the one object, to thereby correct the position P of the detection point DP with respect to the external information sensor 1. Consequently, after influence of candidate points DPH that have a low reliability DOR among the plurality of candidate points DPH on the one object is reduced, and influence of candidate points DPH that have a high reliability DOR is increased, the position P of the detection point DP with respect to the external information sensor 1 can be corrected. As a result, after the respective reliabilities DOR that are set to the positions HP of the plurality of candidate points DPH on the one object based on the resolution of the same external information sensor 1 are reflected, the position P of the detection point DP with respect to the external information sensor 1 can be corrected.

Moreover, the update processing unit 36 obtains each reliability DOR based on the distance from the external information sensor 1 to the detection point DP.

The resolution of the external information sensor 1 changes in accordance with the distance from the external information sensor 1 to the detection point DP. For example, when the external information sensor 1 is formed of the millimeter wave radar, and the distance to the detection point DP is short, the detection point DP is highly likely to be the closest point. Meanwhile, when the distance to the detection point DP is long, the detection point DP is buried in the resolution cell. Thus, the detection point DP is assumed to be a reflection point reflected from the center of an object. Thus, the update processing unit 36 obtains each reliability DOR based on the distance from the external information sensor 1 to the detection point DP. Consequently, the reliability DOR can be obtained based on the performance of the external information sensor 1.

Moreover, when at least one of the width W or the length L of an object cannot be acquired as the object identification element from the external information sensor 1, the update processing unit 36 identifies the value of the object identification element that cannot be acquired from the external information sensor 1 based on the set value that corresponds to the object identification element that cannot be acquired from the external information sensor 1 among the set values individually set in advance in correspondence with the width W and the length L of the object.

Thus, even when the width W and the length L of the object cannot be acquired from the external information sensor 1, the track data TD can be updated while suppressing error. Consequently, the relative positional relationship between the own vehicle and the object is not greatly different from the relative positional relationship, and thus a decrease in precision of automatic driving of the own vehicle can be suppressed to the minimum level.

Second Embodiment

In a second embodiment of the present invention, description of configurations and functions which are the same as or equivalent to those in the first embodiment is omitted. In the second embodiment, the processing that branches when the determination result of the determination processing in Step S51 of FIG. 15 is "No" and when the determination result of the determination processing in Step S54 is "Yes" is different from that in the first embodiment. The other configurations are the same as those in the first embodiment. That is, the other configurations are the configurations and the functions which are the same as or equivalent to those in the first embodiment, and those portions are denoted by the same reference symbols.

Figure 17:
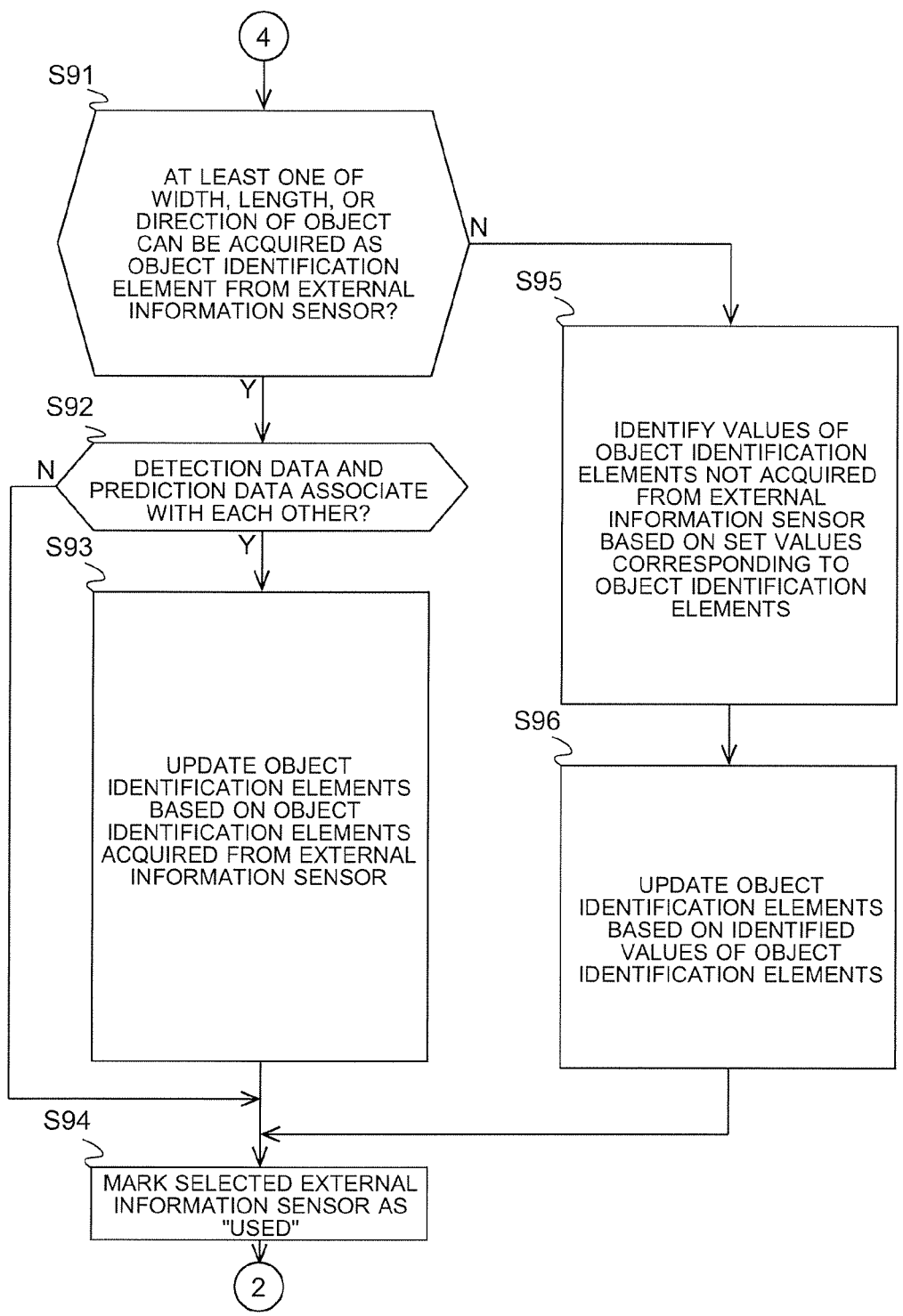
FIG. 17 is a flowchart for illustrating processing that branches when the determination result of the determination processing in Step S51 of FIG. 15 is "No" and when the determination result of the determination processing in Step S54 is "Yes" in a second embodiment of the present invention.

FIG. 17 is a flowchart for illustrating processing that branches when the determination result of the determination processing in Step S51 of FIG. 15 is "No" and when the determination result of the determination processing in Step S54 is "Yes" in the second embodiment. In Step S91, the temporary setting unit 33 determines whether or not at least one of the width W, the length L, or the direction θ of the object, which are the remaining object identification elements included in the detection data dd received from the selected external information sensor 1, can be acquired as an object identification element from the external information sensor 1. When the temporary setting unit 33 determines that at least one of the width W, the length L, or the direction θ of the object, which are the remaining object identification elements included in the detection data dd received from the selected external information sensor 1, can be acquired as an object identification element from the external information sensor 1, the process proceeds from Step S91 to Step S92. When the temporary setting unit 33 determines that at least one of the width W, the length L, or the direction θ of the object, which are the remaining object identification elements included in the detection data dd received from the selected external information sensor 1, cannot be acquired as an object identification element from the external information sensor 1, the process proceeds from Step S91 to Step S95.

In Step S92, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S92 to Step S93. When the association processing unit 35 determines that the detection data $DD_{RT}$ and the prediction data $TD_{RTpred}$ of the track data TD do not associate with each other, the process proceeds from Step S92 to Step S94.

In Step S93, based on the object identification elements that can be acquired from the external information sensor 1 of the width W, the length L, and the direction θ of the object at the current associated time RT, the update processing unit 36 updates object identification elements that correspond to the object identification elements that can be acquired from the external information sensor 1 among the object identification elements included in the track data TD at the current associated time RT. After that, the process proceeds from Step S93 to Step S94.

In Step S94, the data reception unit 32 marks the selected external information sensor 1 as "used". After that, the process returns from Step S94 to Step S15 of FIG. 13.

In Step S95, the update processing unit 36 identifies the object identification elements which cannot be acquired from the external information sensor 1, based on the set values that correspond to the object identification elements that cannot be obtained from the external information sensor 1 among the set values individually set in advance in correspondence with the width W, the length L, and the direction θ of the object. After that, the process proceeds from Step S95 to Step S96.

In Step S96, the update processing unit 36 updates, based on the value of the identified object identification elements, object identification elements that correspond to the identified object identification elements among the object identification elements included in the track data TD at the current associated time RT. After that, the process proceeds from Step S96 to Step S94.

As described above, in the object recognition device 3, when at least one of the width W, the length L, or the direction θ of an object cannot be acquired as the object identification element from the external information sensor 1, the update processing unit 36 identifies the value of the object identification element that cannot be acquired from the external information sensor 1 based on the set value that corresponds to the object identification element that cannot be acquired from the external information sensor 1 among the set values individually set in advance in correspondence with the width W, the length L, and the direction θ of the object.

Thus, even when the width W, the length L, and the direction θ of the object cannot be acquired from the external information sensor 1, the track data TD can be updated while suppressing error. Consequently, the relative positional relationship between the own vehicle and the object is not greatly different from the relative positional relationship, and thus a decrease in precision of automatic driving of the own vehicle can be suppressed to the minimum level.

Third Embodiment

In a second embodiment of the present invention, description of configurations and functions which are the same as or equivalent to those in the first embodiment and the second embodiment is omitted. In the third embodiment, the processing that branches when the determination result of the determination processing in Step S51 of FIG. 15 is "No" and when the determination result of the determination processing in Step S54 is "Yes" is different from that in the first embodiment and the second embodiment. The other configurations are the same as those in the first embodiment and the second embodiment. That is, the other configurations are the configurations and the functions which are the same as or equivalent to those in the first embodiment and the second embodiment, and those portions are denoted by the same reference symbols.

Figure 18:
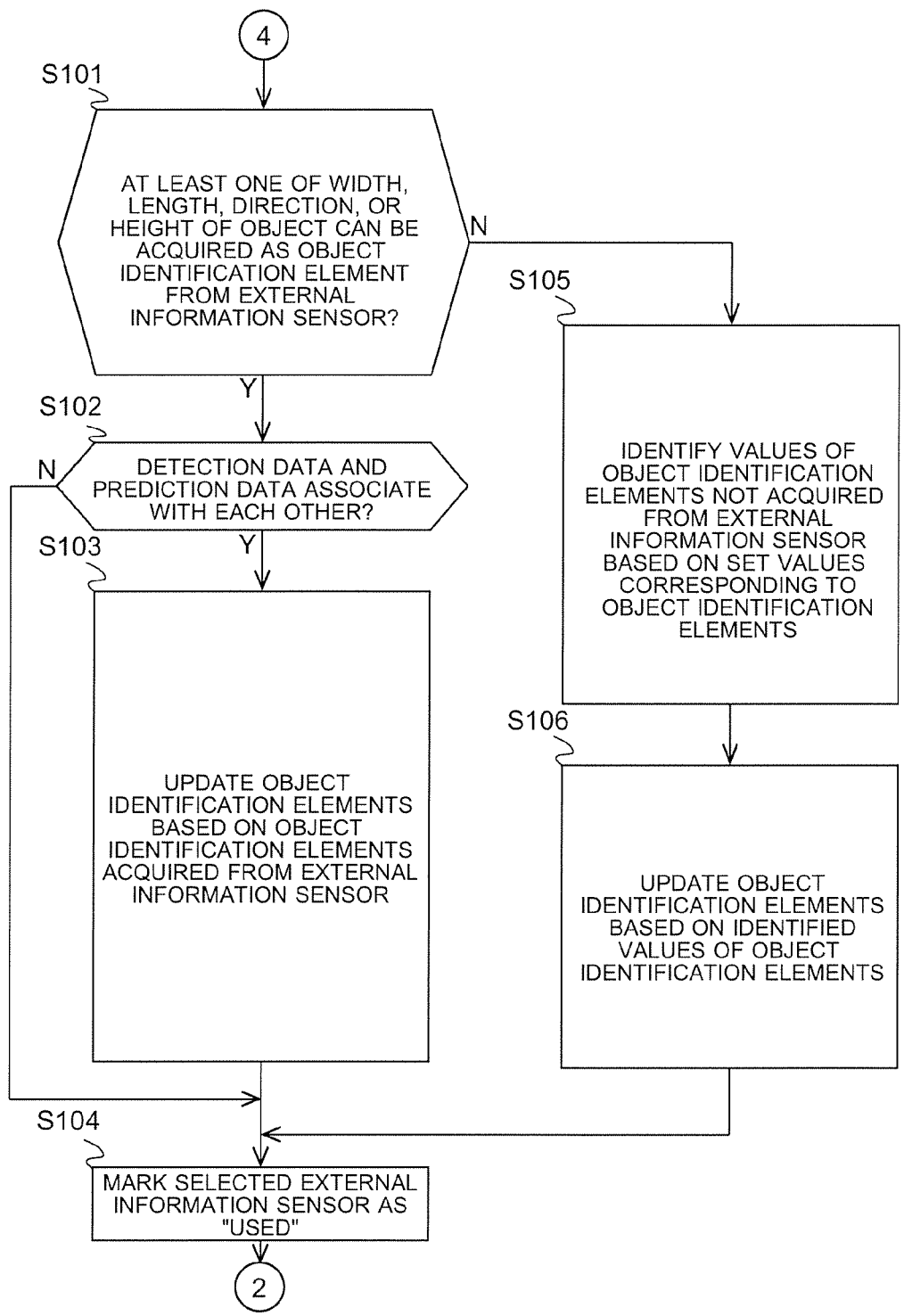
FIG. 18 is a flowchart for illustrating processing that branches when the determination result of the determination processing in Step S51 of FIG. 15 is "No" and when the determination result of the determination processing in Step S54 is "Yes" in a third embodiment of the present invention.

FIG. 18 is a flowchart for illustrating processing that branches when the determination result of the determination processing in Step S51 of FIG. 15 is "No" and when the determination result of the determination processing in Step S54 is "Yes" in the third embodiment. In Step S101, the temporary setting unit 33 determines whether or not at least one of the width W, the length L, the direction θ, or the height H of the object, which are the remaining object identification elements included in the detection data dd received from the selected external information sensor 1, can be acquired as an object identification element from the external information sensor 1. When the temporary setting unit 33 determines at least one of the width W, the length L, the direction θ, or the height H of the object, which are the remaining object identification elements included in the detection data dd received from the selected external information sensor 1, can be acquired as an object identification element from the external information sensor 1, the process proceeds from Step S101 to Step S102. When the temporary setting unit 33 determines that at least one of the width W, the length L, the direction θ, or the height H of the object, which are the remaining object identification elements included in the detection data dd received from the selected external information sensor 1, cannot be acquired as an object identification element from the external information sensor 1, the process proceeds from Step S101 to Step S105.

In Step S102, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S102 to Step S103. When the association processing unit 35 determines that the detection data $DD_{RT}$ and the prediction data $TD_{RTpred}$ of the track data TD do not associate with each other, the process proceeds from Step S102 to Step S104.

In Step S103, the update processing unit 36 updates, based on the object identification elements that can be acquired from the external information sensor 1 of the width W, the length L, the direction θ, and the height H of the object at the current associated time RT, object identification elements that correspond to the object identification elements that can be acquired from the external information sensor 1 among the object identification elements included in the track data TD at the current associated time RT. After that, the process proceeds from Step S103 to Step S104.

In Step S104, the data reception unit 32 marks the selected external information sensor 1 as "used". After that, the process returns from Step S104 to Step S15 of FIG. 13.

In Step S105, the update processing unit 36 identifies the object identification elements which cannot be acquired from the external information sensor 1, based on the set values that correspond to the object identification elements that cannot be obtained from the external information sensor 1 among the set values individually set in advance in correspondence with the width W, the length L, the direction θ, and the height H of the object. After that, the process proceeds from Step S105 to Step S106.

In Step S106, the update processing unit 36 updates, based on the value of the identified object identification elements, object identification elements that correspond to the identified object identification elements among the object identification elements included in the track data TD at the current associated time RT. After that, the process proceeds from Step S106 to Step S104.

As described above, in the object recognition device 3, when at least one of the width W, the length L, the direction θ, or the height H of an object cannot be acquired as the object identification element from the external information sensor 1, the update processing unit 36 identifies the value of the object identification element that cannot be acquired from the external information sensor 1 based on the set value that corresponds to the object identification element that cannot be acquired from the external information sensor 1 among the set values individually set in correspondence with the width W, the length L, the direction θ, and the height H of the object.

Thus, even when the width W, the length L, the direction θ, and the height H of the object cannot be acquired from the external information sensor 1, the track data TD can be updated while suppressing error. Consequently, the relative positional relationship between the own vehicle and the object is not greatly different from the relative positional relationship, and thus a decrease in precision of automatic driving of the own vehicle can be suppressed to the minimum level.

Fourth Embodiment

In a fourth embodiment of the present invention, description of configurations and functions which are the same as or equivalent to those in the first embodiment, the second embodiment, and the third embodiment is omitted. In the fourth embodiment, the processing that branches when the determination result of the determination processing in Step S51 of FIG. 15 is "No" and when the determination result of the determination processing in Step S54 is "Yes" is different from that in the first embodiment, the second embodiment, and the third embodiment. The other configurations are the same as those in the first embodiment, the second embodiment, and the third embodiment. That is, the other configurations are the configurations and the functions which are the same as or equivalent to those in the first embodiment, the second embodiment, and the third embodiment, and those portions are denoted by the same reference symbols.

Figure 19:
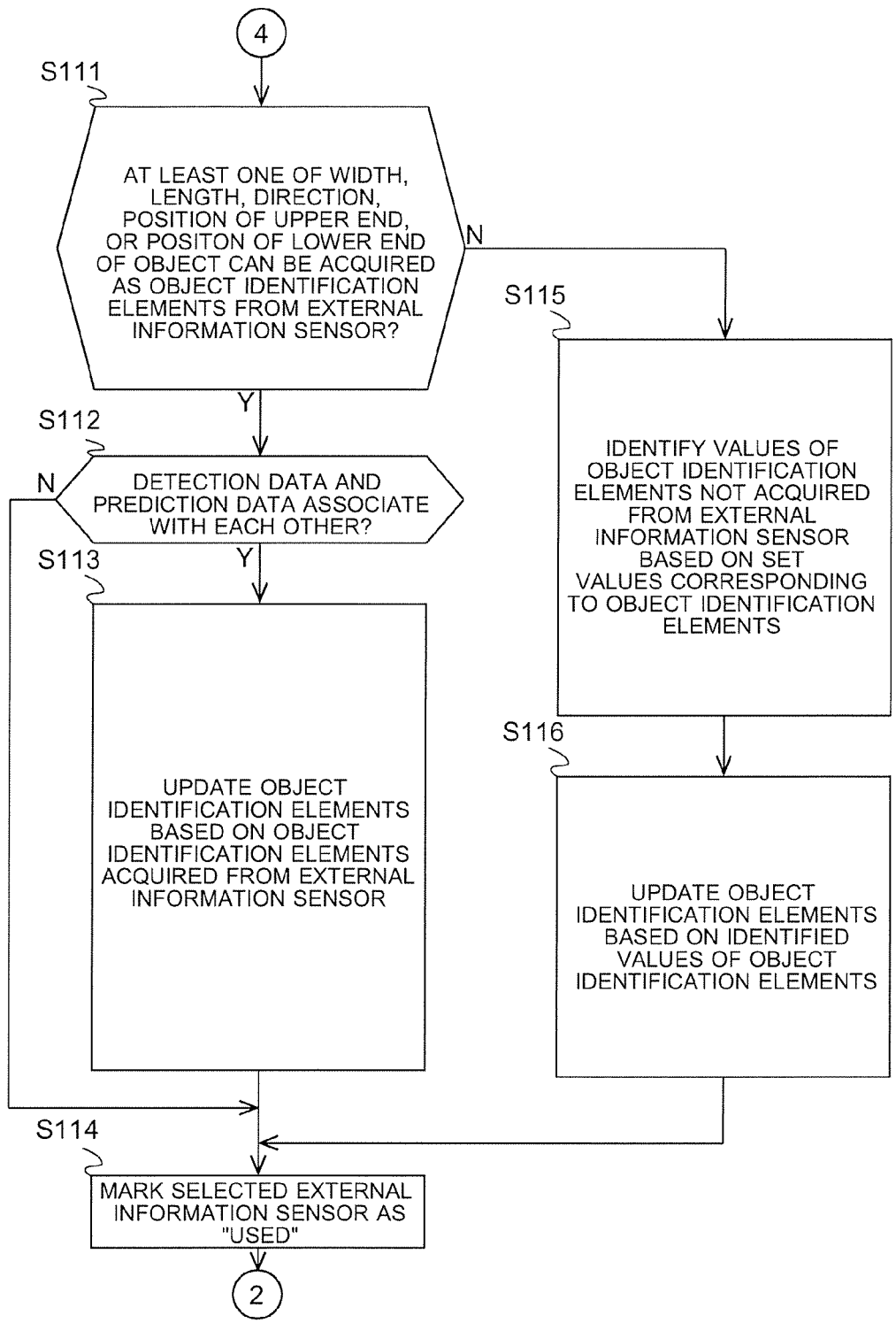
FIG. 19 is a flowchart for illustrating processing that branches when the determination result of the determination processing in Step S51 of FIG. 15 is "No" and when the determination result of the determination processing in Step S54 is "Yes" in a fourth embodiment of the present invention.

FIG. 19 is a flowchart for illustrating processing that branches when the determination result of the determination processing in Step S51 of FIG. 15 is "No" and when the determination result of the determination processing in Step S54 is "Yes" in the fourth embodiment. In Step S111, the temporary setting unit 33 determines whether or not at least one of the width W, the length L, the direction θ, the position P of the upper end $Z_H$, or the position P of the lower end $Z_L$ of the object, which are the remaining object identification elements included in the detection data dd received from the selected external information sensor 1, can be acquired as an object identification element from the external information sensor 1. When the temporary setting unit 33 determines that at least one of the width W, the length L, the direction θ, the position P of the upper end $Z_H$, or the position P of the lower end $Z_L$ of the object, which are the remaining object identification elements included in the detection data dd received from the selected external information sensor 1, can be acquired as an object identification element from the external information sensor 1, the process proceeds from Step S111 to Step S112. When the temporary setting unit 33 determines that at least one of the width W, the length L, the direction θ, the position P of the upper end $Z_H$, or the position P of the lower end $Z_L$ of the object, which are the remaining object identification elements included in the detection data dd received from the selected external information sensor 1, cannot be acquired as an object identification element from the external information sensor 1, the process proceeds from Step S111 to Step S115.

In Step S112, the association processing unit 35 determines whether or not the detection data $DD_{RT}$ and the prediction data $TD_{RTpred}$ of the track data TD associate with each other. When the association processing unit 35 determines that the detection data $DD_{RT}$ and the prediction data $TD_{RTpred}$ of the track data TD associate with each other, the process proceeds from Step S112 to Step S113. When the association processing unit 35 determines that the detection data $DD_{RT}$ and the prediction data $TD_{RTpred}$ of the track data TD do not associate with each other, the process proceeds from Step S112 to Step S114.

In Step S113, the update processing unit 36 updates, based on the object identification elements that can be acquired from the external information sensor 1 of the width W, the length L, the direction θ, the position of the upper end $Z_H$, and the position of the lower end $Z_L$ of the object at the current associated time RT, object identification elements that correspond to the object identification elements that can be acquired from the external information sensor 1 among the object identification elements included in the track data TD at the current associated time RT. After that, the process proceeds from Step S113 to Step S114.

In Step S114, the data reception unit 32 marks the selected external information sensor 1 as "used". After that, the process returns from Step S114 to Step S15 of FIG. 13.

In Step S115, the update processing unit 36 identifies the object identification elements which cannot be acquired from the external information sensor 1, based on the set values that correspond to the object identification elements that cannot be obtained from the external information sensor 1 among the set values individually set in advance in correspondence with the width W, the length L, the direction θ, the position of the upper end $Z_H$, and the position of the lower end $Z_L$ of the object. After that, the process proceeds from Step S115 to Step S116.

In Step S116, the update processing unit 36 updates, based on the value of the identified object identification elements, object identification elements that correspond to the identified object identification elements among the object identification elements included in the track data TD at the current associated time RT. After that, the process proceeds from Step S116 to Step S114.

As described above, in the object recognition device 3, when at least one of the width W, the length L, the direction θ, the position of the upper end $Z_H$, or the position of the lower end $Z_L$ of an object cannot be acquired as the object identification element from the external information sensor 1, the update processing unit 36 identifies the value of the object identification element that cannot be acquired from the external information sensor 1 based on the set value that corresponds to the object identification element that cannot be acquired from the external information sensor 1 among the set values individually set in correspondence with the width W, the length L, the direction θ, the position of the upper end $Z_H$, and the position of the lower end $Z_L$ of the object.

Thus, even when the width W, the length L, the direction θ, the position of the upper end $Z_H$, and the position of the lower end $Z_L$ of the object cannot be acquired from the external information sensor 1, the track data TD can be updated while suppressing error. Consequently, the relative positional relationship between the own vehicle and the object is not greatly different from the relative positional relationship, and thus a decrease in precision of automatic driving of the own vehicle can be suppressed to the minimum level.

Moreover, when the position of the upper end $Z_H$ and the position of the lower end $Z_L$ of the object are also corrected in addition to the width W, the length L, and the direction θ of the object, it is possible to identify whether or not the object is a stationary object. The stationary object is, for example, a signboard. The stationary object may be a traffic sign. Thus, the type of the object can be identified. Consequently, the precision of the automatic driving of the own vehicle can further be increased.

Fifth Embodiment

In a fifth embodiment of the present invention, description of configurations and functions which are the same as or equivalent to those in the first embodiment, the second embodiment, the third embodiment, and the fourth embodiment is omitted. The fifth embodiment is different from the first embodiment in a point that a plurality of candidate points DPH are narrowed down. The other configurations are the same as those in the first embodiment, the second embodiment, the third embodiment, and the fourth embodiment. That is, the other configurations are the configurations and the functions which are the same as or equivalent to those in the first embodiment, the second embodiment, the third embodiment, and the fourth embodiment, and those portions are denoted by the same reference symbols.

Figure 20:
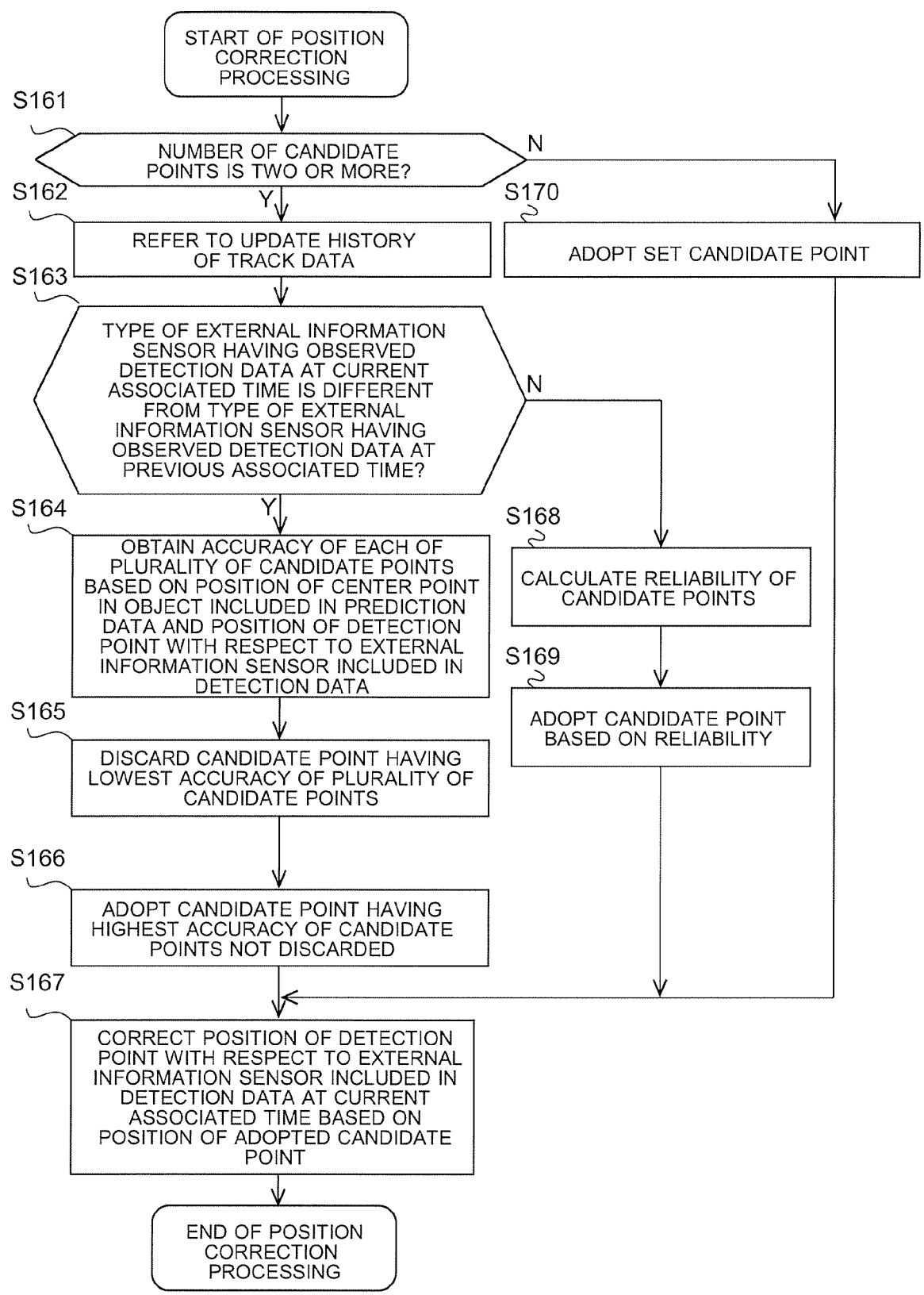
FIG. 20 is a flowchart for illustrating position correction processing executed in Step S20 of FIG. 13 in a fifth embodiment of the present invention.

FIG. 20 is a flowchart for illustrating another example of the position correction processing executed in Step S20 of FIG. 13 in the fifth embodiment. In Step S161, the update processing unit 36 determines whether or not the number of candidate points DPH is two or more. When the update processing unit 36 determines that the number of candidate points DPH is two or more, the process proceeds from Step S161 to Step S162. When the update processing unit 36 determines that the number of candidate points DPH is not two or more, the process proceeds from Step S161 to Step S170.

In Step S162, the update processing unit 36 refers to an update history of the track data TD. After that, the process proceeds from Step S162 to Step S163.

In Step S163, the update processing unit 36 determines whether or not the type of the external information sensor 1 that has observed the detection data DD at the current associated time RT is different from the type of the external information sensor 1 that has observed the detection data DD at the previous associated time RT. When the update processing unit 36 determines that the type of the external information sensor 1 that has observed the detection data DD at the current associated time RT is different from the type of the external information sensor 1 that has observed the detection data DD at the previous associated time RT, the process proceeds from Step S163 to Step S164. When the update processing unit 36 determines that the type of the external information sensor 1 that has observed the detection data DD at the current associated time RT is not different from the type of the external information sensor that has observed the detection data DD at the previous associated time RT, that is, when the type of the external information sensor 1 that has observed the detection data DD at the current associated time RT is the same as the type of the external information sensor 1 that has observed the detection data DD at the previous associated time RT, the process proceeds from Step S163 to Step S168.

In Step S164, the update processing unit 36 determines accuracy of each of the plurality of candidate points DPH based on the position P of the center point in the object included in the prediction data $TD_{RTpred}$ of the track data TD and the position P of the detection point DP with respect to the external information sensor 1 included in the detection data DD. After that, the process proceeds from Step S164 to Step S165.

In Step S165, the update processing unit 36 discards a candidate point DPH that has the lowest accuracy among the plurality of candidate points DPH. After that, the process proceeds from Step S165 to Step S166.

In Step S166, the update processing unit 36 adopts a candidate point DPH that has the highest accuracy among the candidate points DPH that have not been discarded. After that, the process proceeds from Step S166 to Step S167.

In Step S167, the update processing unit 36 corrects the position P of the detection point DP with respect to the external information sensor 1 included in the detection data DD at the current associated time RT based on a position HP of the adopted candidate point DPH. After that, the process does not proceed from Step S167 to other processing steps, and the position correction processing is thus finished.

In Step S168, the update processing unit 36 calculates the reliability DOR of the candidate points DPH. After that, the process proceeds from Step S168 to Step S169.

In Step S169, the update processing unit 36 adopts a candidate point DPH based on the reliability DOR. After that, the process proceeds from Step S169 to Step S167.

In Step S170, the update processing unit 36 adopts the set candidate point DPH. After that, the process proceeds from Step S170 to Step S167.

For example, when the external information sensor 1 is a camera, the detection data dd includes the position P of the detection point DP with respect to the external information sensor 1, the speed V of the detection point DP, and the width W of the object. Moreover, when the external information sensor 1 is a camera, the candidate point DPH(2) is a candidate of the position P of the detection point DP on the object. Thus, the position P of the detection point DP with respect to the external information sensor 1 is corrected based on the position HP of the candidate point DPH(2) by the processing step of Step S161, the processing step of Step S170, and the processing step of Step S167.

Meanwhile, when the external information sensor 1 is a millimeter wave radar, the detection data dd includes the position P of the detection point DP with respect to the external information sensor 1 and the speed V of the detection point DP. Moreover, when the external information sensor 1 is a millimeter wave radar, each of the candidate point DPH(1) and the candidate point DPH(2) is a candidate of the position P of the detection point DP on the object.

In this case, after the processing step of Step S161, the processing step of Step S170, and the processing step of Step S167 are executed as a result of the presence of the association between the detection data dd of the camera and the track data TD, the detection data dd of the millimeter wave radar and the track data TD may associate with each other.

Further, it may be determined that the accuracy of the candidate point DPH(1) is higher than the accuracy of the candidate point DPH(2) based on the position P of the detection point DP with respect to the external information sensor 1 and the position P of the center point in the object. When such a determination for the accuracy is made, the candidate point DPH(2) is discarded from the candidates of the position P of the detection point DP on the object, and the candidate point DPH(1) is adopted by the processing step of Step S164, the processing step of Step S165, and the processing step of Step S166.

As described above, in the object recognition device 3, the update processing unit 36 discards a part of the plurality of candidate points DPH based on the update history of the track data TD.

The update history of the track data TD includes at least a history in which the position P of the center point in the object is updated due to the movement of the object. The history in which the position P of the center point in the object is updated is associated with the external information sensor 1 that has detected the object. Thus, through the reference to the update history of the track data TD, it is possible to refer, through the history in which the position P of the center point in the object is updated, to the type of the external information sensor 1 used when the position P of the detection point DP with respect to the external information sensor 1 was corrected. Consequently, when the type of the external information sensor 1 at the time when the object was detected at the detection point DP is identified, a candidate point DPH used when the position P of the detection point DP with respect to the external information sensor 1 was corrected can be identified.

As described above, when the external information sensor 1 is formed of a millimeter wave radar, it is considered that the closest point and the center point are candidate points DPH. Moreover, as described above, when the external information sensor 1 is formed of a monocular camera, it is considered that the center point is a candidate point DPH.

In this configuration, the accuracy of each of the plurality of candidate points DPH is determined based on the position P of the center point in the object and the position P of the detection point DP with respect to the external information sensor 1. The position P of the center point in the object and the position P of the detection point DP with respect to the external information sensor 1 change in accordance with the track of the object. For example, when a Euclidean distance between the position P of the center point in the object and the position P of the detection point DP with respect to the external information sensor 1 is shorter than the determination threshold distance $D_{TH1}$ of FIG. 6 due to a positional relationship between the position P of the center point in the object and the position P of the detection point DP with respect to the external information sensor 1, it can be considered that a candidate point DPH having high accuracy is the closest point rather than the center point. In this case, of the candidate points DPH, the center point is discarded, and the closest point is adopted.

The determination threshold distance $D_{TH1}$ of FIG. 6 is defined in a range in which the position P of the detection point DP is not buried in the resolution cell of the external information sensor 1.

Moreover, when the object is an object moving on the front side of the own vehicle, the center point is a rear-surface center point of the object. When the object is an object moving on the rear side of the own vehicle, the center point is a front-surface center point of the object.

As described above, the update processing unit 36 discards a part of the plurality of candidate points DPH based on the update history of the track data TD. Consequently, the candidate points DPH having high accuracy can be used to update the track data TD.

Moreover, each embodiment includes a processing circuit for implementing the object recognition device 3. The processing circuit may be dedicated hardware or a CPU (central processing unit, also referred to as processing unit, calculation device, microprocessor, microcomputer, processor, or DSP) for executing programs stored in a memory.

Figure 21:
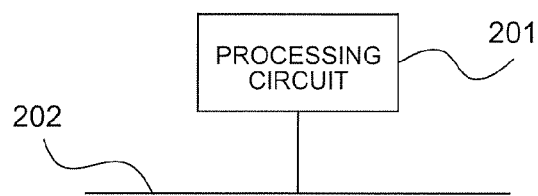
FIG. 21 is a diagram for illustrating a hardware configuration example.

FIG. 21 is a diagram for illustrating a hardware configuration example. In FIG. 21, a processing circuit 201 is connected to a bus 202. When the processing circuit 201 is dedicated hardware, for example, a single circuit, a complex circuit, a programmed processor, an ASIC, an FPGA, or a combination thereof corresponds to the processing circuit 201. Each of the functions of the respective units of the object recognition device 3 may be implemented by the processing circuit 201, or the functions of the respective units may be collectively implemented by the processing circuit 201.

Figure 22:
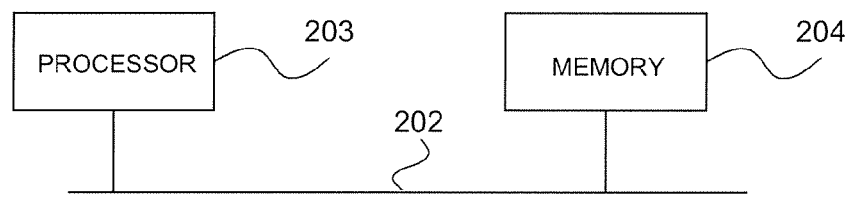
FIG. 22 is a diagram for illustrating another hardware configuration example.

FIG. 22 is a diagram for illustrating another hardware configuration example. In FIG. 22, a processor 203 and a memory 204 are connected to a bus 202. When the processing circuit is a CPU, the functions of the respective units of the object recognition device 3 are implemented by software, firmware, or a combination of software and firmware. The software or the firmware is described as programs, and is stored in the memory 204. The processing circuit reads out and executes the programs stored in the memory 204, to thereby implement the functions of the respective units. That is, the object recognition device 3 includes the memory 204 for storing the programs which consequently execute steps of controlling the time measurement unit 31, the data reception unit 32, the temporary setting unit 33, the prediction processing unit 34, the association processing unit 35, and the update processing unit 36 when the programs are executed by the processing circuit. Moreover, it can be considered that those programs cause the computer to execute procedures or methods of executing the time measurement unit 31, the data reception unit 32, the temporary setting unit 33, the prediction processing unit 34, the association processing unit 35, and the update processing unit 36. In this configuration, a nonvolatile or volatile semiconductor memory such as a RAM, a ROM, a flash memory, an EPROM, an EEPROM, and the like, a magnetic disk, a flexible disk, an optical disc, a compact disc, a MiniDisc, a DVD, and the like correspond to the memory 204.

A part of the functions of the respective units of the object recognition device 3 may be implemented by dedicated hardware, and a remaining part thereof may be implemented by software or firmware. For example, the function of the temporary setting unit 33 can be implemented by a processing circuit as the dedicated hardware. Moreover, the function of the association processing unit 35 can be implemented by a processing circuit reading out and executing the program stored in the memory 204.

As described above, the processing circuit can implement each of the above-mentioned functions by hardware, software, firmware, or a combination thereof.

In the first embodiment, description is given of the example of the processing of determining whether or not the detection data $DD_{RT}$ and the prediction data $TD_{RTpred}$ of the track data $TD_{RT}$ associate with each other through use of the SNN algorithm, the GNN algorithm, the JPDA algorithm, or the like, but the configuration is not limited to this example.

For example, whether or not the detection data $DD_{RT}$ and the prediction data $TD_{RTpred}$ of the track data $TD_{RT}$ associate with each other may be determined based on whether or not a difference between each detection element included in the detection data $DD_{RT}$ and each track element included in the prediction data $TD_{RTpred}$ of the track data $TD_{RT}$ is within an error amount "e" defined in advance.

Specifically, the association processing unit 35 derives a distance difference between the position P with respect to the external information sensor 1 included in the detection data $DD_{RT}$ and the position P included in the prediction data $TD_{RTpred}$ of the track data $TD_{RT}$.

The association processing unit 35 derives a speed difference between the speed V included in the detection data $DD_{RT}$ and the speed V included in the prediction data $TD_{RTpred}$ of the track data $TD_{RT}$.

The association processing unit 35 derives an azimuth angle difference between the azimuth angle included in the detection data $DD_{RT}$ and the azimuth angle included in the prediction data $TD_{RTpred}$ of the track data $TD_{RT}$.

The association processing unit 35 obtains a square root of a sum of squares of the distance difference, the speed difference, and the azimuth angle difference. When the obtained square root exceeds the error amount "e", the association processing unit 35 determines that the detection data $DD_{RT}$ and the prediction data $TD_{RTpred}$ do not associate with each other. When the obtained square root is equal to or less than the error amount "e", the association processing unit 35 determines that the detection data $DD_{RT}$ and the prediction data $TD_{RTpred}$ associate with each other. Through this determination processing, whether or not the detection data $DD_{RT}$ and the prediction data $TD_{RTpred}$ of the track data $TD_{RT}$ associate with each other may be determined.

Moreover, for example, the ground speed at the detection point DP may be obtained based on the speed V of the detection point DP. In a case in which the ground speed at the detection point DP is obtained, when the object detected by the external information sensor 1 has been determined to be the $C_{model2}$ based on the ground speed at the detection point DP, the object identification elements of the detection data DD may not include the width W and the length L of the vehicle $C_{model2}$. In this case, the width W of the vehicle $C_{model2}$ is set to 2 [m], and the length L of the vehicle $C_{model2}$ is set to 4.5 [m]. The width W and the length L of the vehicle $C_{model2}$ set in this manner are also set values individually set in advance in correspondence with the object identification elements that cannot be acquired from the external information sensor 1.

The update processing unit 36 may update the track data TD based on the speed V of the detection point DP at the time when the object was detected by the external information sensor 1. Consequently, the track data TD can be updated based on the speed V of the detection point DP in consideration of the observation result observed by the external information sensor 1. As a result, the relative positional relationship between the own vehicle and the object can accurately be recognized, and the precision of the automatic driving of the own vehicle can thus further be increased.

The processing steps of Step S81 to Step S86 of FIG. 16 in the first embodiment, the processing steps of Step S91 to Step S96 of FIG. 17 in the second embodiment, the processing steps of Step S101 to Step S106 of FIG. 18 in the third embodiment, and the processing steps of Step S111 to Step S116 of FIG. 19 in the fourth embodiment can be executed in parallel by the CPU.

REFERENCE SIGNS LIST

1 external information sensor, 2 vehicle information sensor, 3 object recognition device, 4 notification control device, 5 vehicle control device, 31 time measurement unit, 32 data reception unit, 33 temporary setting unit, 34 prediction processing unit, 35 association processing unit, 36 update processing unit

The invention claimed is:

1. An object recognition device, comprising:
a memory storing instructions; and
at least one hardware processor configured to execute the instructions to implement:
a temporary setting unit configured to set, based on specifications of a sensor that has detected an object, a position of at least one candidate point on the object; and
an update processing unit configured to correct a position of a detection point with respect to the sensor at a time when the sensor has detected the object based on the position of the at least one candidate point on the object, and to update track data indicating a track of the object based on a position of the detection point with respect to the sensor after the correction,
wherein the temporary setting unit is configured to set the position of the at least one candidate point on the object based on resolution included in the specifications of the sensor that has detected the object, and the resolution includes angle resolution and distance resolution.

2. The object recognition device according to claim 1, wherein the update processing unit is configured to correct, when a plurality of candidate points exist for one detection point, the position of the detection point with respect to the sensor based on a reliability of each of the plurality of candidate points and a position of each of the plurality of candidate points on the object.

3. The object recognition device according to claim 2, wherein the update processing unit is configured to correct the position of the detection point with respect to the sensor based on the position of a candidate point that has the highest reliability among the positions of the plurality of candidate points on the object.

4. The object recognition device according to claim 2, wherein the update processing unit is configured to correct the position of the detection point with respect to the sensor by obtaining a weighted average of the respective positions of the plurality of candidate points on the object in accordance with the respective reliabilities.

5. The object detection device according to claim 2, wherein the update processing unit is configured to obtain each of the reliabilities based on a distance from the sensor to the detection point.

6. The object detection device according to claim 2, wherein the update processing unit is configured to discard a part of the candidate points of the plurality of candidate points based on an update history of the track data.

7. The object detection device according to claim 1, wherein the update processing unit is configured to correct the position of the detection point with respect to the sensor based on an object identification element that identifies at least one of a state or a size of the object, wherein the object identification element is data.

8. The object recognition device according to claim 7, wherein the update processing unit is configured to identify, when at least one of a width or a length of the object is unavailable from the sensor as the object identification element, a value of the object identification element unavailable from the sensor based on, among set values individually set in advance in correspondence with the width and the length of the object, the set value corresponding to the object identification element unavailable from the sensor.

9. The object recognition device according to claim 7, wherein the update processing unit is configured to identify, when at least one of a width, a length, or a direction of the object is unavailable from the sensor as the object identification element, a value of the object identification element unavailable from the sensor based on, among set values individually set in advance in correspondence with the width, the length, and the direction of the object, the set value corresponding to the object identification element unavailable from the sensor.

10. The object recognition device according to claim 7, wherein the update processing unit is configured to identify, when at least one of a width, a length, a direction, or a height of the object is unavailable from the sensor as the object identification element, a value of the object identification element unavailable from the sensor based on, among set values individually set in advance in correspondence with the width, the length, the direction, and the height of the object, the set value corresponding to the object identification element unavailable from the sensor.

11. The object recognition device according to claim 7, wherein the update processing unit is configured to identify, when at least one of a width, a length, a direction, a position of an upper end, or a position of a lower end of the object is unavailable from the sensor as the object identification element, a value of the object identification element unavailable from the sensor based on, among set values individually set in advance in correspondence with the width, the length, the direction, the position of the upper end, and the position of the lower end of the object, the set value corresponding to the object identification element unavailable from the sensor.

12. An object recognition method, comprising the steps of:
setting, based on specifications of a sensor that has detected an object, a position of at least one candidate point on the object; and
correcting a position of a detection point with respect to the sensor at a time when the sensor has detected the object based on the position of the at least one candidate point on the object, and updating track data indicating a track of the object based on a position of the detection point with respect to the sensor after the correction,
wherein the setting is configured to set the position of the at least one candidate point on the object based on resolution included in the specifications of the sensor that has detected the object, and the resolution includes angle resolution and distance resolution.

* * * * *